United States Patent
Sudo et al.

(10) Patent No.: US 10,106,740 B2
(45) Date of Patent: *Oct. 23, 2018

(54) NEMATIC LIQUID CRYSTAL COMPOSITION AND LIQUID CRYSTAL DISPLAY ELEMENT USING SAME

(71) Applicant: DIC CORPORATION, Tokyo (JP)

(72) Inventors: Go Sudo, Kita-adachi-gun (JP); Shotaro Kawakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 14/651,001

(22) PCT Filed: Nov. 29, 2013

(86) PCT No.: PCT/JP2013/082192
§ 371 (c)(1),
(2) Date: Jul. 21, 2015

(87) PCT Pub. No.: WO2014/091946
PCT Pub. Date: Jun. 19, 2014

(65) Prior Publication Data
US 2015/0315469 A1 Nov. 5, 2015

(30) Foreign Application Priority Data
Dec. 12, 2012 (JP) ................................. 2012-271293

(51) Int. Cl.
| | | |
|---|---|---|
| G02F 1/1333 | (2006.01) | |
| C09K 19/30 | (2006.01) | |
| C09K 19/54 | (2006.01) | |
| C09K 19/02 | (2006.01) | |
| C09K 19/20 | (2006.01) | |
| C09K 19/04 | (2006.01) | |
| C09K 19/12 | (2006.01) | |

(52) U.S. Cl.
CPC ...... C09K 19/3066 (2013.01); C09K 19/0216 (2013.01); C09K 19/20 (2013.01); C09K 19/2014 (2013.01); C09K 19/542 (2013.01); C09K 2019/0448 (2013.01); C09K 2019/123 (2013.01); C09K 2019/301 (2013.01); C09K 2019/3004 (2013.01); C09K 2019/3009 (2013.01); C09K 2019/3016 (2013.01); C09K 2019/548 (2013.01)

(58) Field of Classification Search
CPC .............. C09K 19/3066; C09K 19/542; C09K 19/0216; C09K 19/20; C09K 2019/548; C09K 2019/0448; C09K 2019/123; C09K 2019/3004; C09K 2019/3009; C09K 2019/301; C09K 2019/3016
USPC ..................... 252/299.63; 428/1.1
See application file for complete search history.

(56) References Cited

U.S. PATENT DOCUMENTS

| | | | |
|---|---|---|---|
| 5,384,065 A | 1/1995 | Geelhaar et al. | |
| 5,599,480 A | 2/1997 | Tarumi et al. | |
| 7,351,453 B2* | 4/2008 | Ichinose | C09K 19/12 |
| | | | 252/299.63 |
| 9,102,869 B2* | 8/2015 | Furusato | C09K 19/3003 |
| 9,260,661 B2* | 2/2016 | Sudo | C09K 19/3066 |
| 2002/0014613 A1 | 2/2002 | Klasen et al. | |
| 2002/0015132 A1 | 2/2002 | Kobayashi et al. | |
| 2003/0222245 A1 | 12/2003 | Klasen-Memmer et al. | |
| 2006/0124896 A1 | 6/2006 | Klasen-Memmer et al. | |
| 2006/0238696 A1 | 10/2006 | Wen et al. | |
| 2008/0011984 A1 | 1/2008 | Fujita et al. | |
| 2008/0138542 A1 | 6/2008 | Son et al. | |
| 2008/0149891 A1 | 6/2008 | Klasen-Memmer et al. | |
| 2008/0308768 A1 | 12/2008 | Klasen-Memmer et al. | |
| 2009/0090892 A1 | 4/2009 | Fujita et al. | |
| 2009/0103011 A1 | 4/2009 | Bernatz et al. | |

(Continued)

FOREIGN PATENT DOCUMENTS

| | | |
|---|---|---|
| EP | 0474062 A2 | 3/1992 |
| JP | 8-104869 A | 4/1996 |

(Continued)

OTHER PUBLICATIONS

International Search Report dated Dec. 22, 2014, issued in application No. PCT/JP2014/075483 (correspodning to U.S. Appl. No. 14/787,139).
International Search Report dated Feb. 25, 2014, issued in application No. PCT/JP2014/050645 (orrespodning to U.S. Appl. No. 14/422,275).
Non-Final Office Action dated Jul. 29, 2016, issued in U.S. Appl. No. 14/787,139.
Final Office Action dated Feb. 10, 2017, issued in U.S. Appl. No. 14/787,139.

(Continued)

Primary Examiner — Geraldina Visconti
(74) Attorney, Agent, or Firm — Westerman, Hattori, Daniels & Adrian, LLP

(57) ABSTRACT

There is provided a liquid crystal composition having a dielectric anisotropy (Δε) large in absolute value, a sufficiently low viscosity (η), a sufficiently low rotational viscosity ($\gamma_1$), and a high elastic constant ($K_{33}$) without decreased refractive index anisotropy (Δn) or nematic phase-isotropic liquid phase transition temperature ($T_{ni}$). A liquid crystal display device, such as a VA mode liquid crystal display device, including the liquid crystal composition has high response speed and good display quality with few or no display defects. The liquid crystal display device including the liquid crystal composition is useful as an active-matrix liquid crystal display device and is applicable as a liquid crystal display device such as a VA mode or PSVA mode liquid crystal display device.

20 Claims, No Drawings

(56) References Cited

U.S. PATENT DOCUMENTS

| | | |
|---|---|---|
| 2009/0278088 A1 | 11/2009 | Masukawa |
| 2009/0324854 A1 | 12/2009 | Masukawa |
| 2010/0051864 A1 | 3/2010 | Klasen-Memmer et al. |
| 2011/0043747 A1 | 2/2011 | Kawasaki et al. |
| 2011/0149226 A1 | 6/2011 | Saito et al. |
| 2012/0162595 A1 | 6/2012 | Lee et al. |
| 2012/0305843 A1 | 12/2012 | Klasen-Memmer et al. |
| 2013/0183460 A1 | 7/2013 | Klasen-Memmer et al. |
| 2013/0248763 A1 | 9/2013 | Goebel et al. |
| 2014/0097383 A1 | 4/2014 | Furusato et al. |
| 2015/0315469 A1 | 11/2015 | Sudo et al. |

FOREIGN PATENT DOCUMENTS

| | | | |
|---|---|---|---|
| JP | 2001-354967 A | 12/2001 | |
| JP | 2003-327965 A | 11/2003 | |
| JP | 2006-037054 A | 2/2006 | |
| JP | 2006-301643 A | 11/2006 | |
| JP | 2008-031432 A | 2/2008 | |
| JP | 2008-143902 A | 6/2008 | |
| JP | 2008-144135 A | 6/2008 | |
| JP | 2009-057562 A | 3/2009 | |
| JP | 2011-042696 A | 3/2011 | |
| JP | 2012-037008 * | 2/2012 | ............ C09K 19/42 |
| KR | 101077606 A | 2/2005 | |
| WO | 2007/077872 A1 | 7/2007 | |
| WO | 2009-136534 A1 | 11/2009 | |
| WO | 2009-157313 A1 | 12/2009 | |
| WO | 2010/029843 A1 | 3/2010 | |
| WO | 2013/125379 A1 | 8/2013 | |

OTHER PUBLICATIONS

Non-Final Office Action dated Nov. 3, 2017, issued in U.S. Appl. No. 14/787,139.

Notice of Allowance dated Nov. 9, 2015 issued in U.S. Appl. No. 14/422,275.

Non-Final Office Action dated Jul. 27, 2015 issued in U.S. Appl. No. 14/422,275.

* cited by examiner

NEMATIC LIQUID CRYSTAL COMPOSITION AND LIQUID CRYSTAL DISPLAY ELEMENT USING SAME

TECHNICAL FIELD

The present invention relates to nematic liquid crystal compositions having a negative dielectric anisotropy (Δε) and useful as liquid crystal display materials and to liquid crystal display devices using such liquid crystal compositions.

BACKGROUND ART

Liquid crystal display devices are used in applications such as clocks, calculators, various household electric appliances, measuring instruments, automotive panels, word processors, electronic organizers, printers, computers, and televisions. Typical liquid crystal display modes include the twisted nematic (TN) mode, the super-twisted nematic (STN) mode, the dynamic scattering (DS) mode, the guest-host (GH) mode, the in-plane switching (IPS) mode, the optically compensated birefringence (OCB) mode, the electrically controlled birefringence (ECB) mode, the vertical alignment (VA) mode, the color super-homeotropic (CSH) mode, and the ferroelectric liquid crystal (FLC) mode. Example addressing schemes include static addressing, multiplex addressing, simple matrix addressing, and active matrix (AM) addressing using devices such as thin-film transistors (TFTs) and thin-film diodes (TFDs).

Some display modes, including the IPS mode, the ECB mode, the VA mode, and the CSH mode, are characterized by the use of liquid crystal materials having a negative Δε. In particular, the VA display mode with AM addressing is used in applications, such as televisions, requiring high speed and wide viewing angle.

The display modes such as the VA mode require nematic liquid crystal compositions that allow for low-voltage operation, quick response, and a wide operating temperature range. Specifically, these display modes require nematic liquid crystal compositions having a negative Δε large in absolute value, low viscosity, and a high nematic phase-isotropic liquid phase transition temperature ($T_{ni}$). The refractive index anisotropy (Δn) of liquid crystal materials must also be adjusted to match the cell gap (d) in terms of the product of Δn and the cell gap, i.e., Δn×d. Liquid crystal materials having a low viscosity (η) are also required for applications, such as televisions, where quick response is important.

Various compounds having a negative Δε large in absolute value have so far been researched to improve the properties of liquid crystal compositions.

As an example liquid crystal material having a negative Δε, there is disclosed a liquid crystal composition containing the following liquid crystal compounds (A) and (B) having a 2,3-difluorophenylene backbone (see PTL 1):

[Chem. 1]

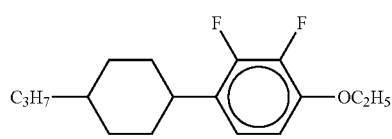
(A)

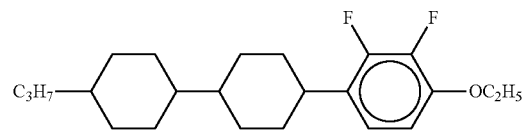
(B)

This liquid crystal composition contains the liquid crystal compounds (C) and (D) as compounds having a Δε of substantially zero. Unfortunately, this liquid crystal composition does not have a sufficiently low viscosity for applications, such as liquid crystal televisions, requiring quick response.

[Chem. 2]

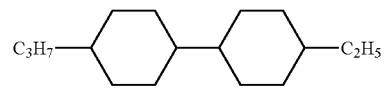
(C)

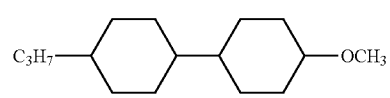
(D)

Also disclosed are liquid crystal compositions containing the compound represented by formula (E). One such liquid crystal composition contains the liquid crystal compound (D) and has a low Δn (see PTL 2). Another liquid crystal composition contains a compound, such as the liquid crystal compound (F), having an alkenyl group in the molecule thereof (i.e., an alkenyl compound), which is added to improve response speed (see PTL 3). Unfortunately, further research is needed to achieve both a high Δn and high reliability.

[Chem. 3]

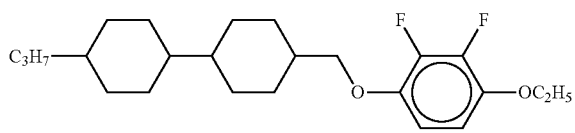
(E)

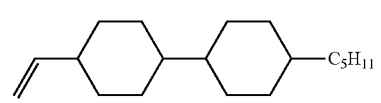
(F)

Also disclosed is a liquid crystal composition containing the compound represented by formula (G) (see PTL 4). Unfortunately, this liquid crystal composition contains an alkenyl compound, such as the liquid crystal compound (F), which tends to cause display defects such as burn-in and display unevenness.

[Chem. 4]

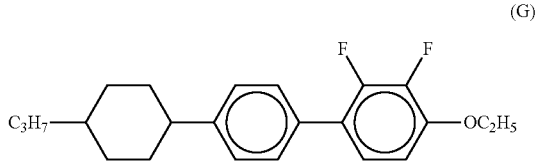

(G)

The influence of liquid crystal compositions containing alkenyl compounds on display defects has been disclosed (see PTL 5). A liquid crystal composition containing a smaller amount of alkenyl compound generally has a higher η, which makes it difficult to achieve quick response. It is therefore difficult to achieve both fewer display defects and quick response.

As discussed above, it is difficult to develop a liquid crystal composition that has a negative Δε, that combines a high Δn and a low η, and that causes few or no display defects simply by the use of a compound having a negative Δε in combination with the liquid crystal compounds (C), (D), and (F).

Also disclosed is a liquid crystal composition containing the compounds of formulae (A) and (G) in combination with the compound of formula (III-F31), which has a Δε of substantially zero (see PTL 6). It is believed, however, that the amount of compound having a low vapor pressure in the liquid crystal composition cannot be increased since it evaporates at extremely low pressure during the injection of the liquid crystal composition into liquid crystal cells in the manufacture of liquid crystal display devices; therefore, the amount of compound of formula (III-F31) present in the liquid crystal composition is limited. Unfortunately, this liquid crystal composition has a high Δn but a significantly high viscosity.

[Chem. 5]

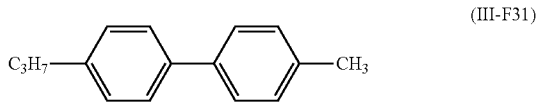

(III-F31)

PTLs 6 and 7 disclose liquid crystal compositions containing compounds having a fluorine-substituted terphenyl structure.

PTL 8 discloses the use of a liquid crystal material having a high factor as expressed by equation (1) to provide a homeotropic liquid crystal cell with improved response speed. Unfortunately, this technique is insufficient.

[Math. 1]

$$FoM = K_{33} \cdot \Delta n^2 / \gamma_1 \qquad \text{equation (1)}$$

where
$K_{33}$: elastic constant
$\Delta n$: refractive index anisotropy
$\gamma_1$: rotational viscosity Accordingly, there is a need for a liquid crystal composition having a sufficiently low viscosity (η), a sufficiently low rotational viscosity ($\gamma_1$), and a high elastic constant ($K_{33}$) without decreased refractive index anisotropy (Δn) or nematic phase-isotropic liquid phase transition temperature ($T_{ni}$) in applications, such as liquid crystal televisions, requiring quick response.

CITATION LIST

Patent Literature

PTL 1: Japanese Unexamined Patent Application Publication No. 8-104869
PTL 2: European Patent Application Publication No. 0474062
PTL 3: Japanese Unexamined Patent Application Publication No. 2006-37054
PTL 4: Japanese Unexamined Patent Application Publication No. 2001-354967
PTL 5: Japanese Unexamined Patent Application Publication No. 2008-144135
PTL 6: WO2007/077872
PTL 7: Japanese Unexamined Patent Application Publication No. 2003-327965
PTL 8: Japanese Unexamined Patent Application Publication No. 2006-301643

SUMMARY OF INVENTION

Technical Problem

An object of the present invention is to provide a liquid crystal composition having a negative dielectric anisotropy (Δε) large in absolute value, a sufficiently low viscosity (η), a sufficiently low rotational viscosity ($\gamma_1$), and a high elastic constant ($K_{33}$) without decreased refractive index anisotropy (Δn) or nematic phase-isotropic liquid phase transition temperature ($T_{ni}$) and to provide a liquid crystal display device, such as a VA mode liquid crystal display device, using such a liquid crystal composition and having high response speed and good display quality with few or no display defects.

Solution to Problem

The inventors have researched various bicyclohexyls and fluorobenzenes and have found that the foregoing object can be achieved by the use of a combination of particular compounds, which has led to the present invention.

The present invention provides a liquid crystal composition containing a first component and a second component. The first component is a compound represented by formula (I):

[Chem. 6]

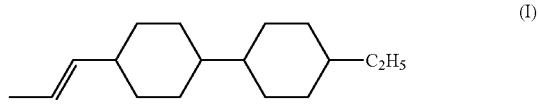 [SMILES: C/C=C/C1CCC(C2CCC(CC)CC2)CC1]

(I)

The first component is present in an amount of 3% to 50% by mass. The second component is a compound having a negative dielectric anisotropy (Δε) larger than 3 in absolute value. The present invention further provides a liquid crystal display device including the liquid crystal composition.

Advantageous Effects of Invention

The liquid crystal composition according to the present invention has a negative dielectric anisotropy (Δε) large in absolute value, a sufficiently low viscosity (η), a sufficiently low rotational viscosity ($\gamma_1$), and a high elastic constant ($K_{33}$) without decreased refractive index anisotropy (Δn) or nematic phase-isotropic liquid phase transition temperature ($T_{ni}$). The liquid crystal display device, such as a VA mode liquid crystal display device, using the liquid crystal composition according to the present invention has high response speed and good display quality with few or no display defects.

DESCRIPTION OF EMBODIMENTS

A liquid crystal composition according to the present invention contains a first component. The first component is a compound represented by formula (I). The first component is present in an amount of 3% to 50% by mass, preferably 5% to 40% by mass, more preferably 10% to 30% by mass. More specifically, the first component is preferably present in an amount of 20% to 50% by mass to achieve a low viscosity or rotational viscosity and is preferably present in an amount of 10% to 30% by mass if the inhibition of precipitation at low temperatures is important.

The liquid crystal composition according to the present invention further contains a second component. The second component includes one or more compounds having a negative Δε larger than 3 in absolute value. The second component is preferably present in an amount of 10% to 90% by mass, more preferably 20% to 80% by mass, even more preferably 30% to 70% by mass.

The second component is preferably a compound represented by general formula (II):

[Chem. 7]

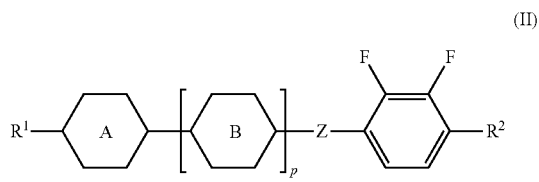

(II)

where $R^1$ and $R^2$ are each independently an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, where one or more nonadjacent —CH$_2$— groups present in $R^1$ and $R^2$ are each independently optionally replaced by —O— and/or —S—, and one or more hydrogen atoms present in $R^1$ and $R^2$ are each independently optionally replaced by a fluorine atom or a chlorine atom; rings A and B are each independently trans-1,4-cyclohexylene, 1,4-phenylene, 2-fluoro-1,4-phenylene, 3-fluoro-1,4-phenylene, 3,5-difluoro-1,4-phenylene, 2,3-difluoro-1,4-phenylene, 1,4-cyclohexenylene, 1,4-bicyclo[2.2.2]octylene, piperidine-1,4-diyl, naphthalene-2,6-diyl, decahydronaphthalene-2,6-diyl, or 1,2,3,4-tetrahydronaphthalene-2,6-diyl; p is 0, 1, or 2; and Z is —OCH$_2$—, —CH$_2$O—, —CF$_2$O—, —OCF$_2$—, —CH$_2$CH$_2$—, —CF$_2$CF$_2$—, or a single bond).

In the formula, $R^1$ and $R^2$ are preferably each independently a linear alkyl group having 1 to 5 carbon atoms, an alkoxyl group having 1 to 5 carbon atoms, an alkenyl group having 2 to 5 carbon atoms, or an alkenyloxy group having 2 to 5 carbon atoms. More preferably, $R^1$ is an alkyl group having 1 to 5 carbon atoms or an alkenyl group having 2 to 5 carbon atoms, and $R^2$ is an alkoxyl group having 1 to 5 carbon atoms.

In the formula, rings A and B are preferably each independently trans-1,4-cyclohexylene, 1,4-phenylene, 2-fluoro-1,4-phenylene, 3-fluoro-1,4-phenylene, 3,5-difluoro-1,4-phenylene, or 2,3-difluoro-1,4-phenylene, more preferably trans-1,4-cyclohexylene or 1,4-phenylene.

In the formula, p is preferably each independently 0 or 1.

In the formula, Z is preferably —CH$_2$O—, —CF$_2$O—, —CH$_2$CH$_2$—, or a single bond, more preferably —CH$_2$O— or a single bond.

The liquid crystal composition according to the present invention contains one or more second components, preferably two to ten second components.

The compound represented by general formula (II) is preferably any of compounds of general formulae (II-A1) to (II-A5) and (II-B1) to (II-B5), more preferably any of compounds of general formulae (II-A1) to (II-A5), even more preferably a compound of general formula (II-A1) or (II-A3):

[Chem. 8]

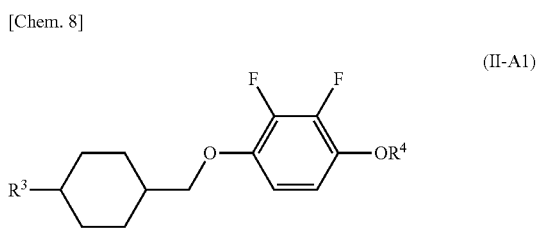

(II-A1)

(II-A2)

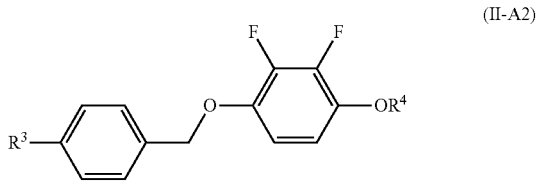

(II-A3)

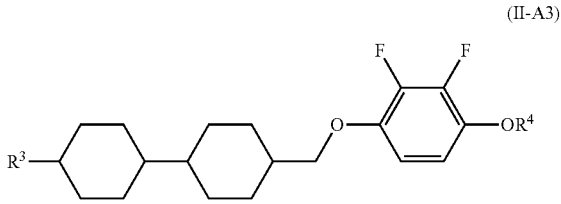

(II-A4)

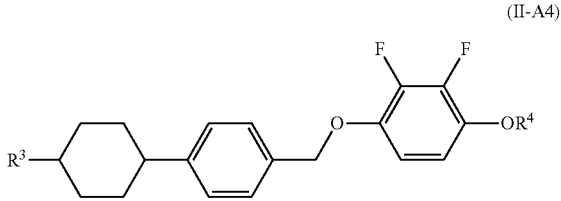

(II-A5)

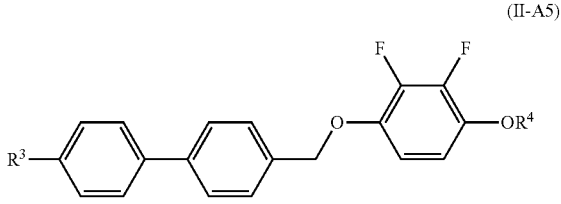

[Chem. 9]

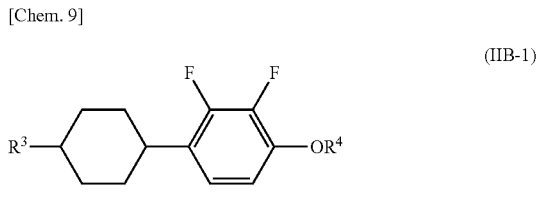

(IIB-1)

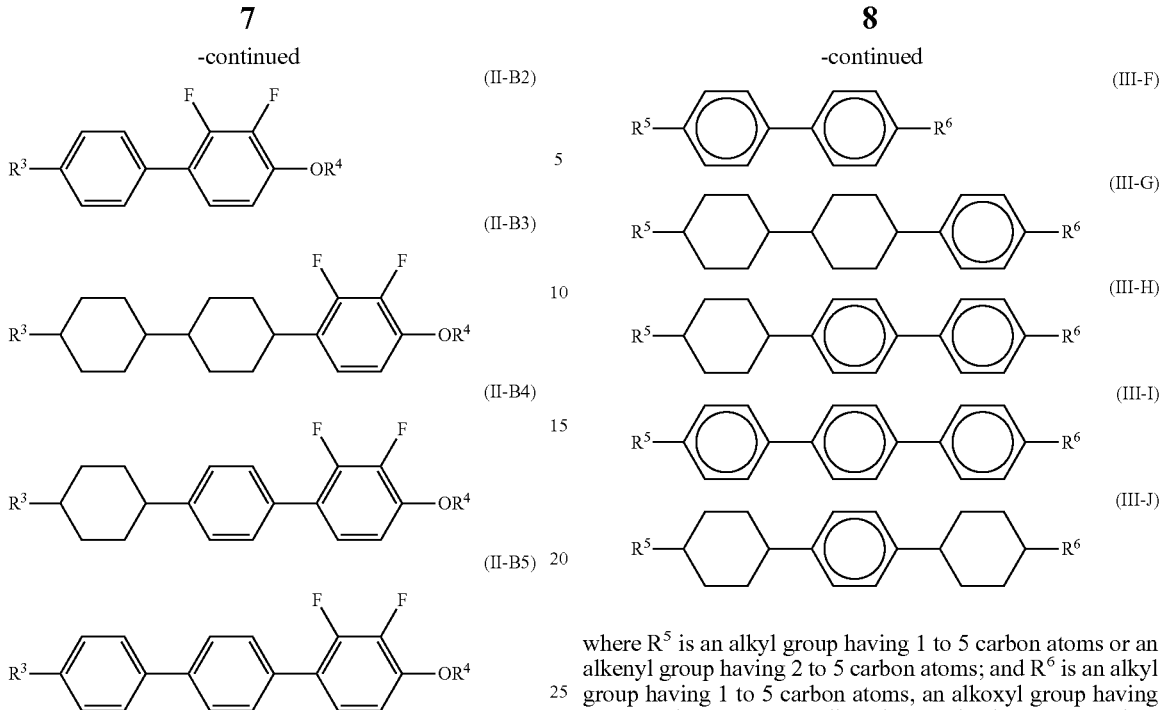

where $R^3$ and $R^4$ are each independently an alkyl group having 1 to 5 carbon atoms or an alkenyl group having 2 to 5 carbon atoms, where one or more hydrogen atoms present in $R^3$ and $R^4$ are each independently optionally replaced by a fluorine atom.

The liquid crystal composition according to the present invention preferably further contains a third component. The third component is preferably present in an amount of 10% to 70% by mass, more preferably 20% to 60% by mass. The third component includes one or more compounds selected from the group consisting of compounds represented by general formulae (III-A) to (III-J):

[Chem. 10]

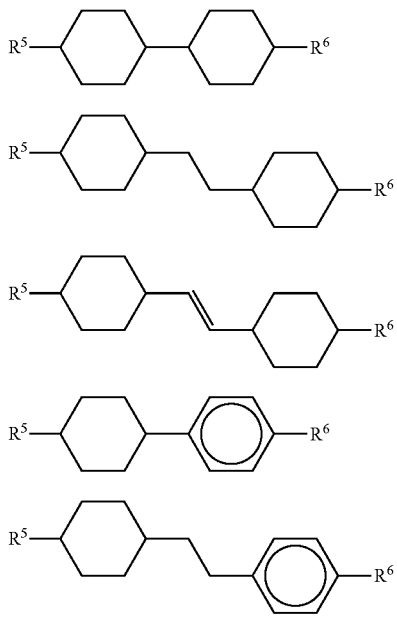

where $R^5$ is an alkyl group having 1 to 5 carbon atoms or an alkenyl group having 2 to 5 carbon atoms; and $R^6$ is an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms, where the compound represented by formula (I) is excluded from the compounds represented by general formula (III-A). Preferably, the third component is a compound selected from compounds of general formulae (III-A), (III-D), (III-F), (III-G), and (III-H), more preferably a compound of general formula (III-A). Particularly preferred are compounds represented by general formula (III-A) where $R^5$ is an alkenyl group having 2 carbon atoms and $R^6$ is an alkyl group having 1 to 5 carbon atoms.

The liquid crystal composition according to the present invention preferably simultaneously contains any of the following combinations of compounds: the compound of formula (I), a compound of general formula (II-A1), and a compound of general formula (III-A); the compound of formula (I), a compound of general formula (II-A3), and a compound of general formula (III-A); the compound of formula (I), a compound of general formula (II-B1), and a compound of general formula (III-A); the compound of formula (I), a compound of general formula (II-B2), and a compound of general formula (III-A); the compound of formula (I), a compound of general formula (II-B3), and a compound of general formula (III-A); and the compound of formula (I), a compound of general formula (II-B4), and a compound of general formula (III-A). More preferably, the liquid crystal composition according to the present invention simultaneously contains any of the following combinations of compounds: the compound of formula (I), a compound of general formula (II-A1), and a compound of general formula (III-A); the compound of formula (I), a compound of general formula (II-A3), and a compound of general formula (III-A); and the compound of formula (I), a compound of general formula (II-A1), a compound of general formula (II-A3), and a compound of general formula (III-A).

The liquid crystal composition according to the present invention preferably further contains another component. The other component is preferably present in an amount of 2% to 30% by mass, more preferably 2% to 25% by mass, even more preferably 3% to 20% by mass. The other component includes one or more compounds represented by general formula (V):

[Chem. 11]

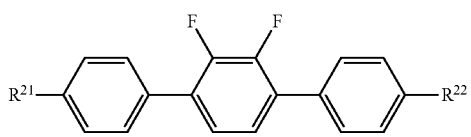

(V)

where $R^{21}$ and $R^{22}$ are each independently an alkyl group having 1 to 8 carbon atoms, an alkoxyl group having 1 to 8 carbon atoms, an alkenyl group having 2 to 8 carbon atoms, or an alkenyloxyl group having 2 to 8 carbon atoms, preferably an alkyl group having 1 to 5 carbon atoms or an alkenyl group having 2 to 5 carbon atoms.

The compounds represented by formula (I), general formula (II), and general formulae (III-A) to (III-J) are preferably present in the liquid crystal composition according to the present invention in a total amount of 85% to 100% by mass, more preferably 90% to 100% by mass, even more preferably 95% to 100% by mass. The compounds represented by formula (I), general formula (II), general formulae (III-A) to (III-J), and general formula (V) are preferably present in the liquid crystal composition according to the present invention in a total amount of 90% to 100% by mass, more preferably 95% to 100% by mass.

The liquid crystal composition according to the present invention has a dielectric anisotropy (Δε) at 25° C. of −2.0 to −8.0, preferably −2.0 to −6.0, more preferably −2.0 to −5.0, even more preferably −2.5 to −4.0.

The liquid crystal composition according to the present invention has a refractive index anisotropy (Δn) at 20° C. of 0.08 to 0.14, preferably 0.09 to 0.13, more preferably 0.09 to 0.12. More specifically, the liquid crystal composition according to the present invention preferably has a refractive index anisotropy (Δn) at 20° C. of 0.10 to 0.13 for small cell gaps and preferably has a refractive index anisotropy (Δn) at 20° C. of 0.08 to 0.10 for large cell gaps.

The liquid crystal composition according to the present invention has a viscosity (η) at 20° C. of 10 to 30 mPa·s, preferably 10 to 25 mPa·s, more preferably 10 to 22 mPa·s.

The liquid crystal composition according to the present invention has a rotational viscosity (γ₁) at 20° C. of 60 to 130 mPa·s, preferably 60 to 110 mPa·s, more preferably 60 to 100 mPa·s.

The liquid crystal composition according to the present invention has a nematic phase-isotropic liquid phase transition temperature ($T_{ni}$) of 60° C. to 120° C., preferably 70° C. to 100° C., more preferably 70° C. to 85° C.

The liquid crystal composition according to the present invention may further contain other components such as common nematic liquid crystals, smectic liquid crystals, cholesteric liquid crystals, antioxidants, and ultraviolet absorbers.

The liquid crystal composition according to the present invention may contain one or more polymerizable compounds.

A liquid crystal composition containing a polymerizable compound can be used, for example, as a liquid crystal composition for liquid crystal display devices such as PSA mode and PSVA mode liquid crystal display devices.

A specific example of a polymerizable compound is represented by general formula (RM-1):

[Chem. 12]

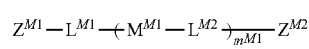

(RM-1)

where $Z^{M1}$ and $Z^{M2}$ are each independently:

[Chem. 13]

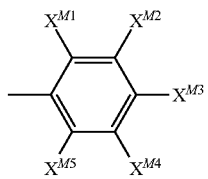

where $X^{M1}$ to $X^{M5}$ are each a hydrogen atom, a fluorine atom, or:

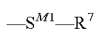      [Chem. 14]

At least one of $X^{M1}$ to $X^{M5}$ is:

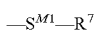      [Chem. 15]

Preferably, $X^{M2}$ or $X^{M3}$ is:

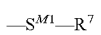      [Chem. 16]

More preferably, $X^{M3}$ is:

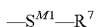      [Chem. 17]

$S^{M1}$ is an alkylene group having 1 to 12 carbon atoms or a single bond, where the —CH₂— group(s) in the alkylene group is optionally replaced by an oxygen atom, —COO—, —OCO—, or —OCOO—, with the proviso that no oxygen atoms are directly linked to each other. For PSA mode liquid crystal display devices, at least one $S^{M1}$ is preferably a single bond. Particularly preferred are compounds where each $S^{M1}$ is a single bond and compounds where one $S^{M1}$ is a single bond and another $S^{M1}$ is an alkylene group having 1 to 8 carbon atoms or —O—(CH₂)ₛ—, where s is preferably 1 to 4, preferably an alkylene group having 1 to 4 carbon atoms.

$R^7$ is any of formulae (R-1) to (R-15):

[Chem. 18]

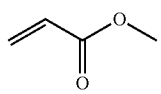 (R-1)

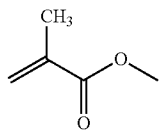 (R-2)

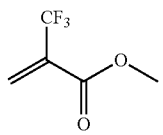 (R-3)

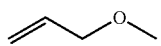 (R-4)

-continued

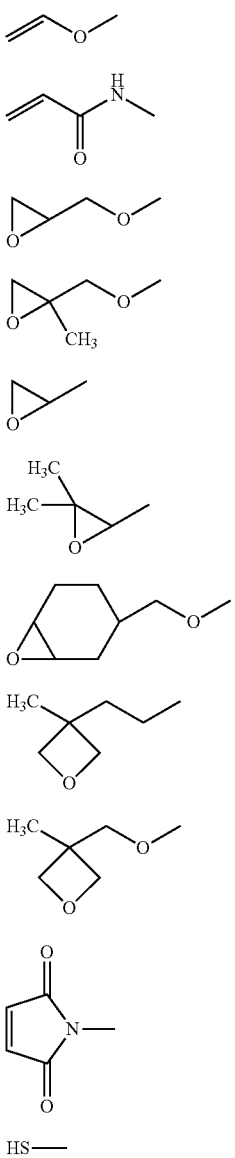

(R-5)
(R-6)
(R-7)
(R-8)
(R-9)
(R-10)
(R-11)
(R-12)
(R-13)
(R-14)
(R-15)

Preferably, $R^7$ is formula (R-1) or (R-2).

$L^{M1}$ and $L^{M2}$ are each independently a single bond, —O—, —CH$_2$—, —OCH$_2$—, —CH$_2$O—, —CO—, —C$_2$H$_4$—, —COO—, —OCO—, —CH=CH—COO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF=CF—, —CF$_2$—, —CF$_2$O—, —OCF$_2$—, —CF$_2$CH$_2$—, —CH$_2$CF$_2$—, —CF$_2$CF$_2$—, or —C≡C—. If there is more than one $L^{M2}$, each may be the same or different and is preferably —COO—, —OCO—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —C≡C—, or a single bond, more preferably —COO—, —OCO—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, or a single bond.

$M^{M1}$, if present, is 1,4-phenylene, 1,4-cyclohexylene, or naphthalene-2,6-diyl. The hydrogen atoms present in these groups are optionally replaced by a fluorine atom, a chlorine atom, an alkyl, halogenated alkyl, halogenated alkoxy, or alkoxy group having 1 to 8 carbon atoms, a nitro group, or:

$$-S^{M1}-R^7$$  [Chem. 19]

$m^{M1}$ is 0, 1, or 2, preferably 0 or 1.

If there is more than one $X^{M1}$, $X^{M2}$, $X^{M3}$, $X^{M4}$, $X^{M5}$, $S^{M1}$, $R^{M1}$, $L^{M2}$, and/or $M^{M1}$, each may be the same or different.

More specifically, the liquid crystal composition according to the present invention preferably contains one or more polymerizable compounds represented by general formula (RM-1) and having a ring structure where $L^{M1}$ is a single bond and $m^{M1}$ is 0, as represented by general formula (IV):

[Chem. 20]

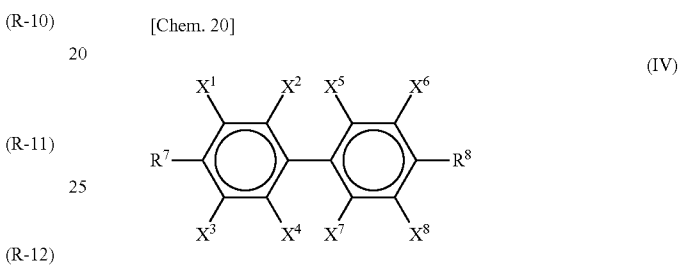

(IV)

where $X^1$ to $X^8$ are each independently trifluoromethyl, trifluoromethoxy, fluorine, or hydrogen, and $R^7$ and $R^8$ are each independently any of formulae (R-1) to (R-15):

[Chem. 21]

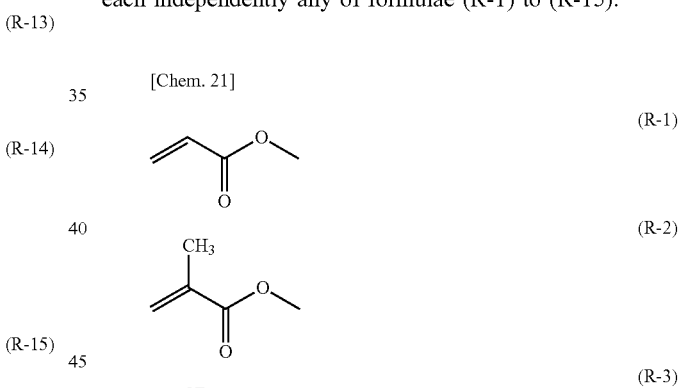

(R-1)
(R-2)
(R-3)
(R-4)
(R-5)
(R-6)
(R-7)
(R-8)

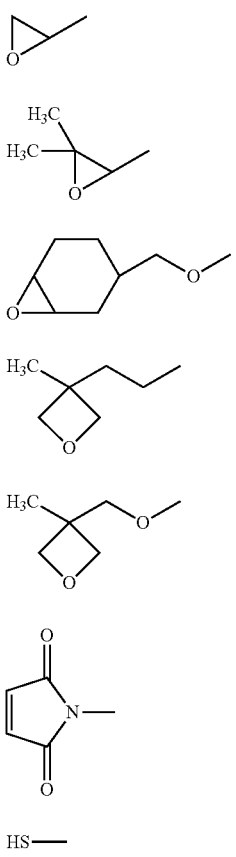
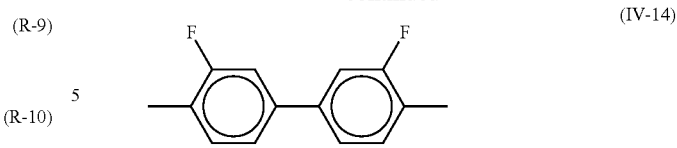
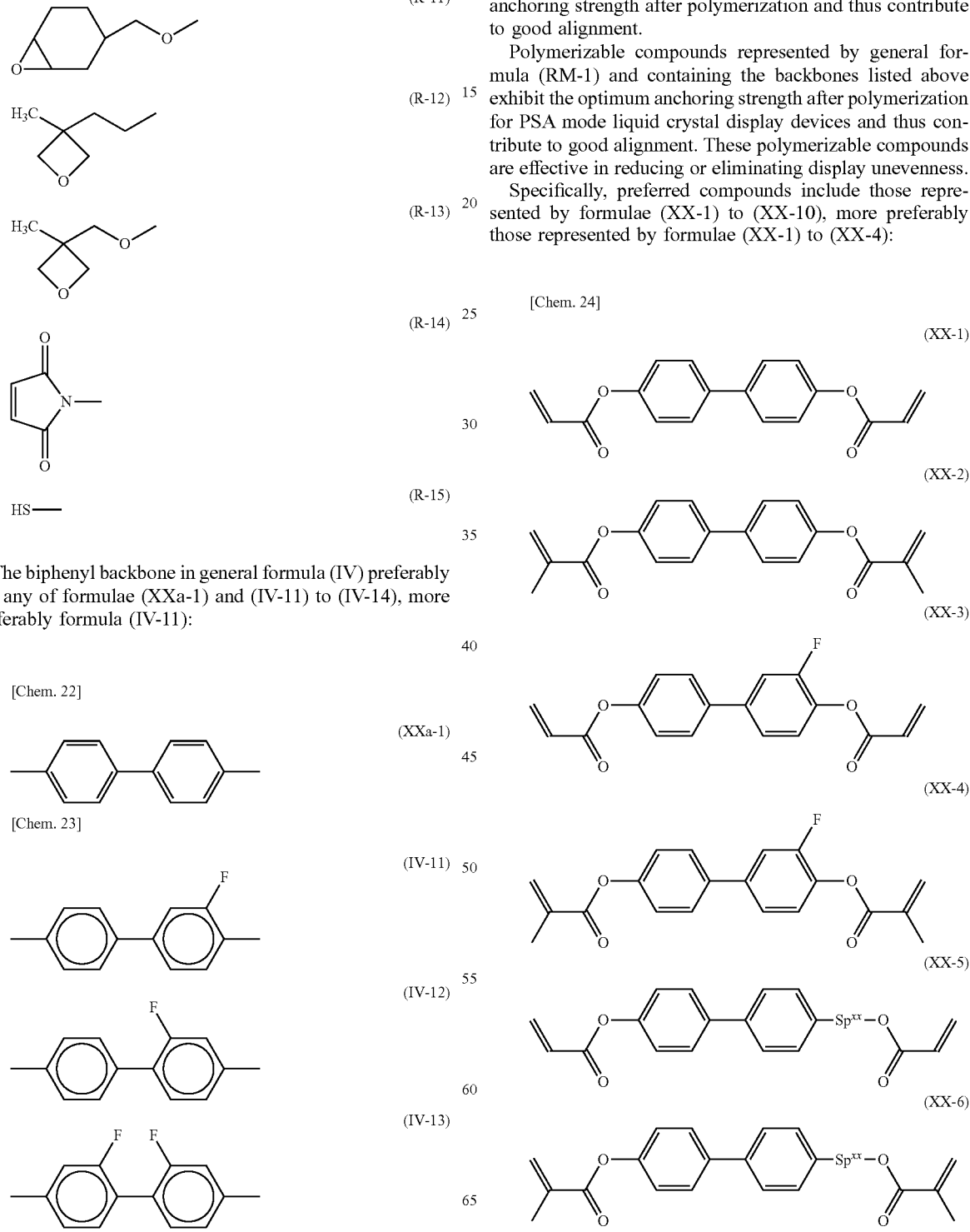

Polymerizable compounds containing the backbones represented by formulae (IV-11) to (IV-14) exhibit the optimum anchoring strength after polymerization and thus contribute to good alignment.

Polymerizable compounds represented by general formula (RM-1) and containing the backbones listed above exhibit the optimum anchoring strength after polymerization for PSA mode liquid crystal display devices and thus contribute to good alignment. These polymerizable compounds are effective in reducing or eliminating display unevenness.

Specifically, preferred compounds include those represented by formulae (XX-1) to (XX-10), more preferably those represented by formulae (XX-1) to (XX-4):

The biphenyl backbone in general formula (IV) preferably has any of formulae (XXa-1) and (IV-11) to (IV-14), more preferably formula (IV-11):

-continued (XX-7)
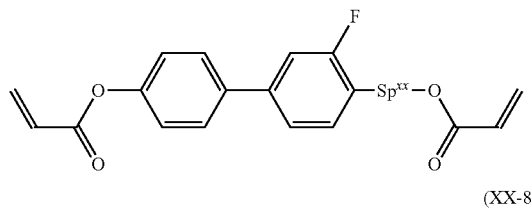

(XX-8)
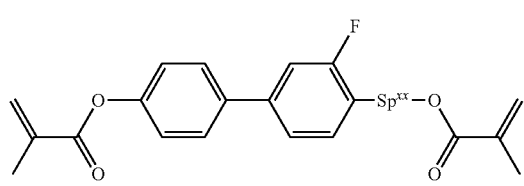

(XX-9)
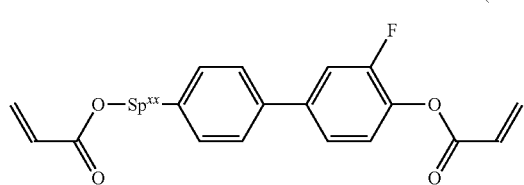

(XX-10)
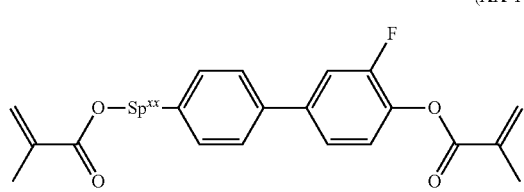

where $Sp^{xx}$ is an alkylene group having 1 to 8 carbon atoms or —O—$(CH_2)_s$— (where s is an integer of 2 to 7, and the oxygen atom is linked to the ring).

Also preferred are polymerizable compounds represented by general formula (RM-1) and having a ring structure where $m^{M1}$ is 1, for example, polymerizable compounds represented by formulae (M31) to (M48):

[Chem. 25]

(M31)
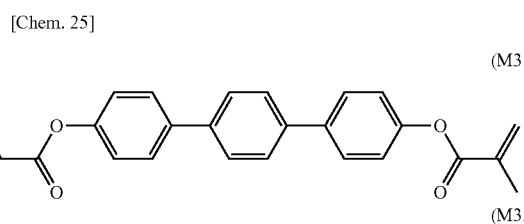

(M32)
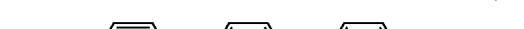

(M33)

(M34)
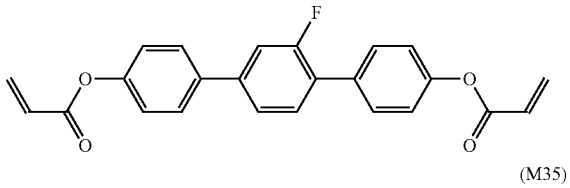

(M35)
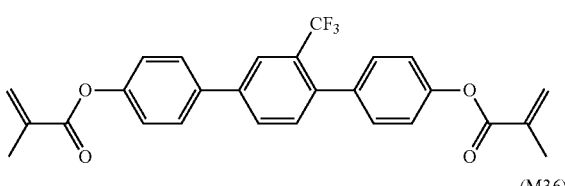

(M36)
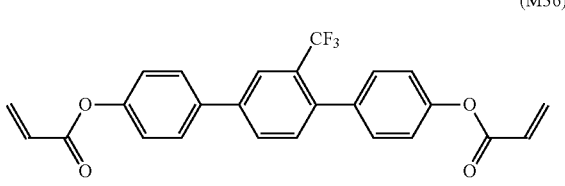

(M37)
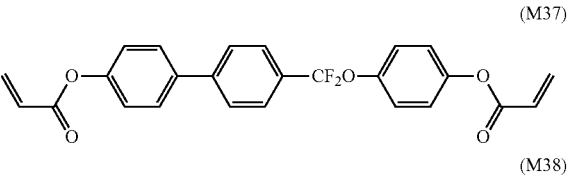

(M38)
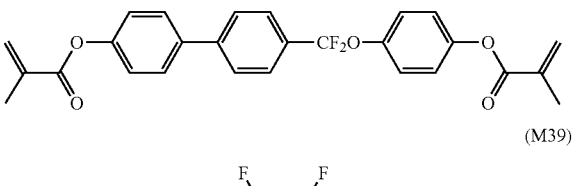

(M39)
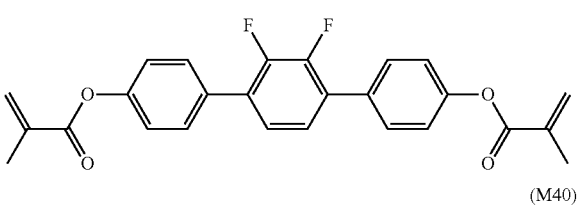

(M40)

(M41)

(M42)

-continued (M43)
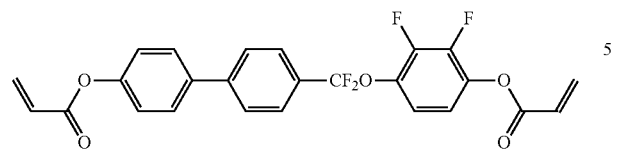

(M44)
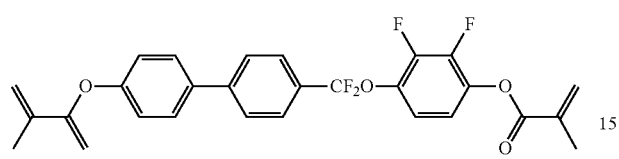

(M45)
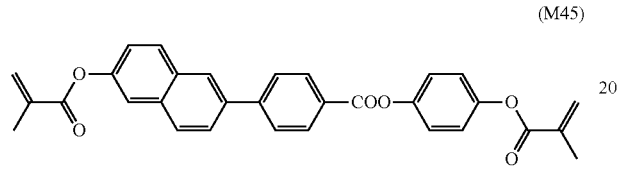

(M46)
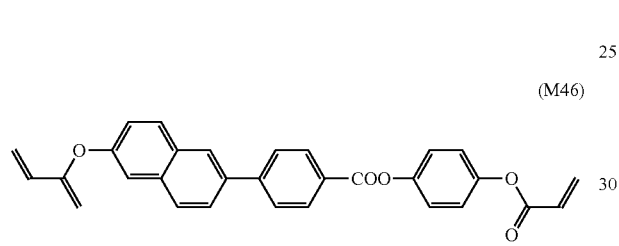

(M47)
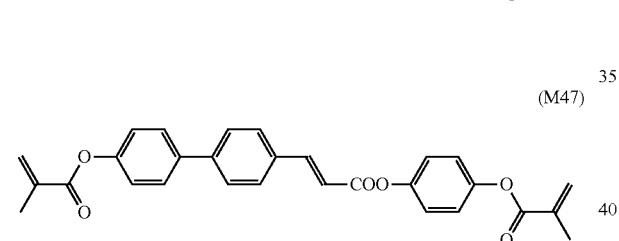

(M48)
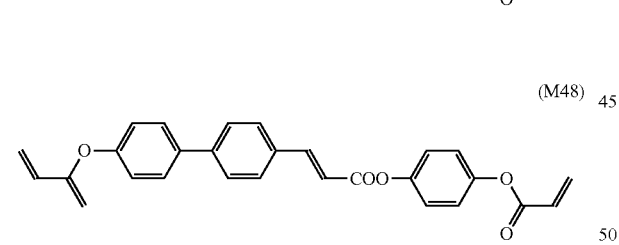

where the hydrogen atoms in the phenyl and naphthalene groups are optionally replaced by any of —F, —Cl, —CF$_3$, —CH$_3$, and formulae (R-1) to (R-15).

Polymerizable compounds represented by general formula (RM-1) and containing the backbones listed above exhibit the optimum anchoring strength after polymerization for PSA mode liquid crystal display devices and thus contribute to good alignment. These polymerizable compounds are effective in reducing or eliminating display unevenness.

Also preferred are polymerizable compounds represented by general formula (RM-1) and having a ring structure where $L^{M1}$ is a single bond and $m^{M1}$ is 1, for example, polymerizable compounds represented by formulae (M301) to (M316):

[Chem. 26]

(M301)
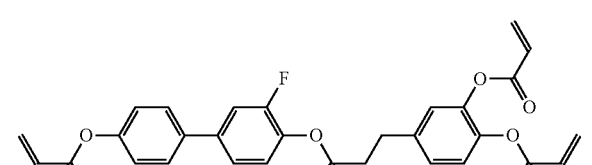

(M302)
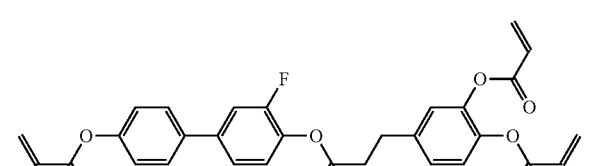

(M303)
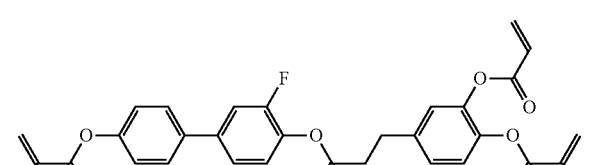

(M304)
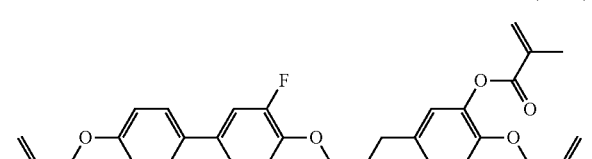

(M305)
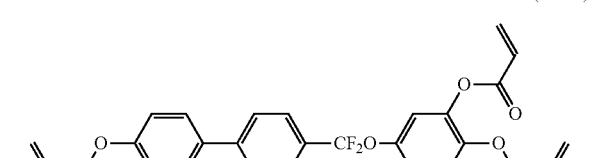

(M306)
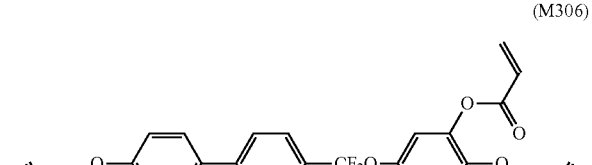

(M307)
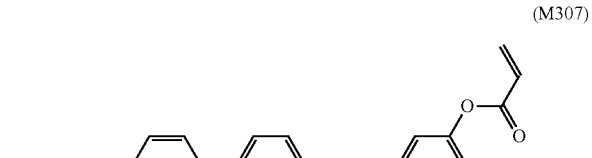

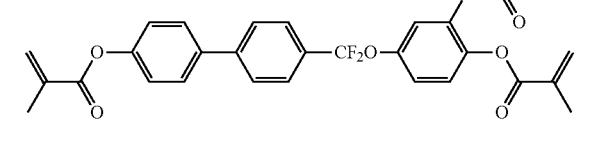

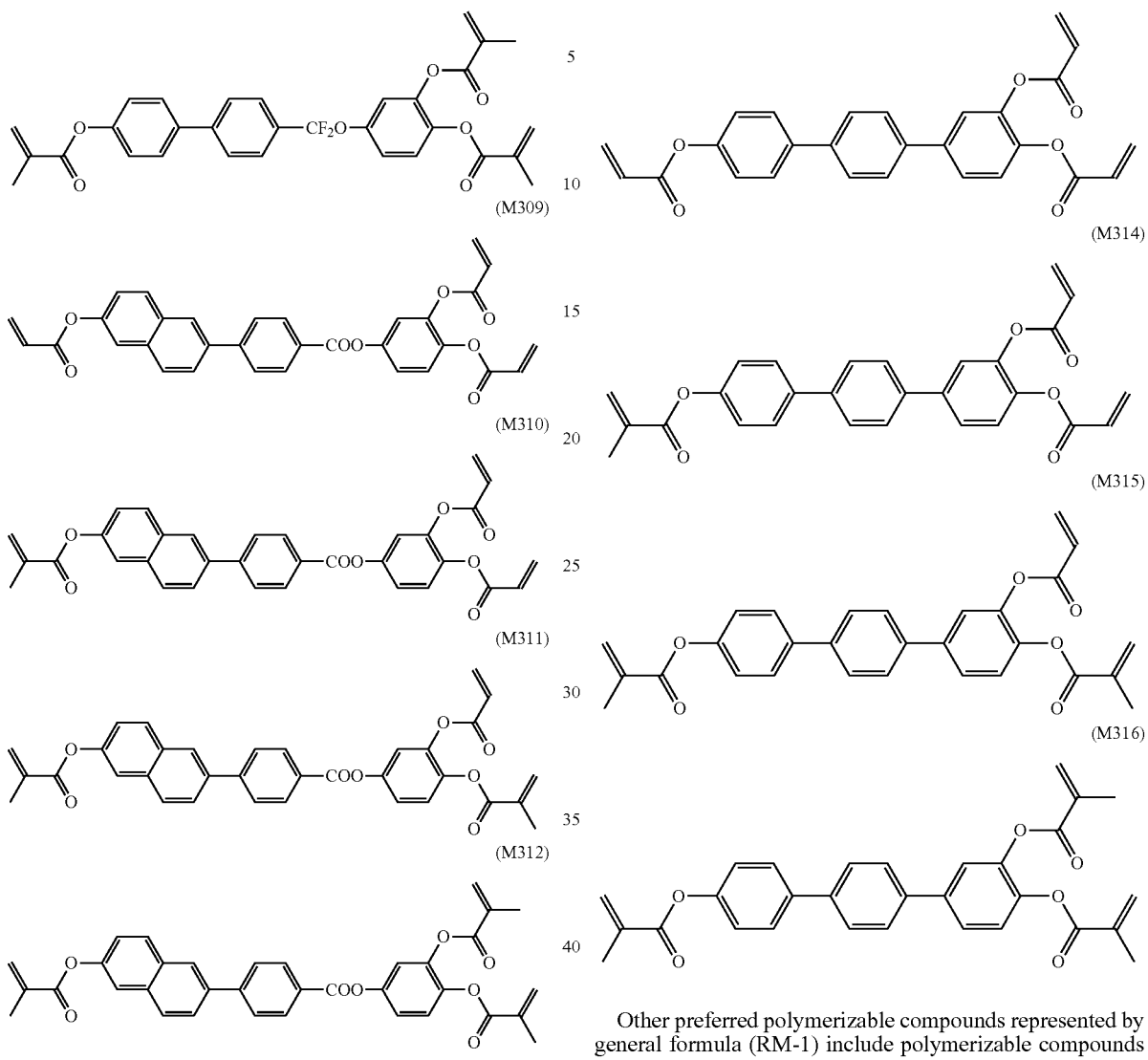
Other preferred polymerizable compounds represented by general formula (RM-1) include polymerizable compounds represented by formulae (Ia-1) to (Ia-31):
[Chem. 27]
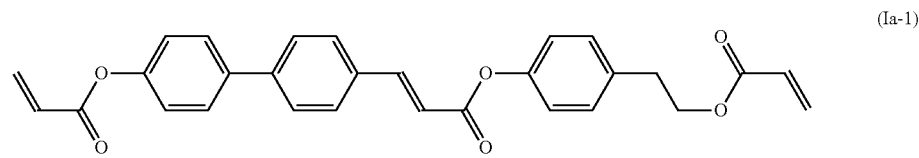
(Ia-1)
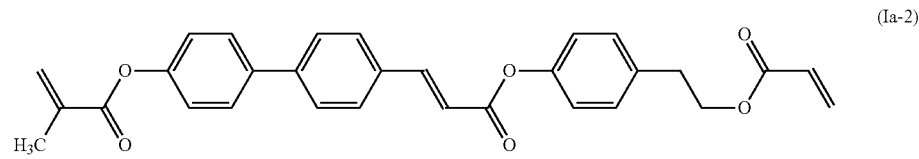
(Ia-2)
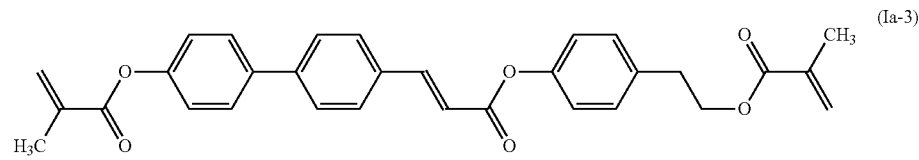
(Ia-3)

-continued
(Ia-4)
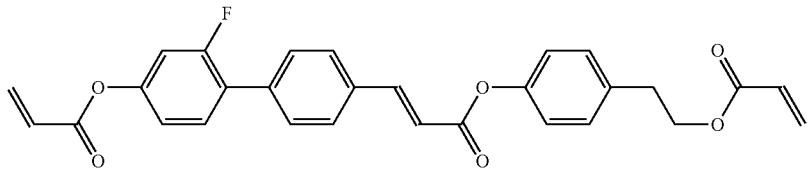
(Ia-5)
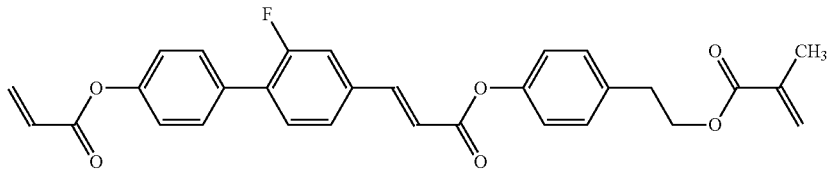
(Ia-6)
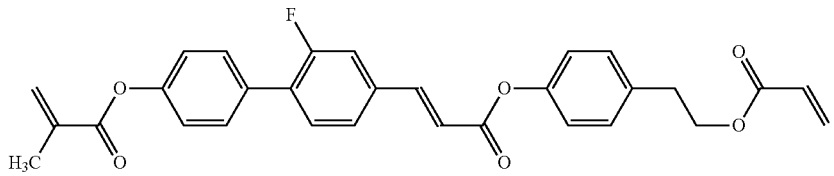
(Ia-7)
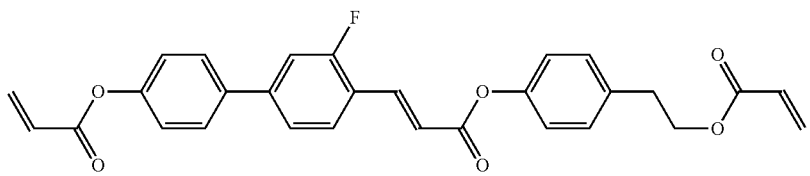
(Ia-8)
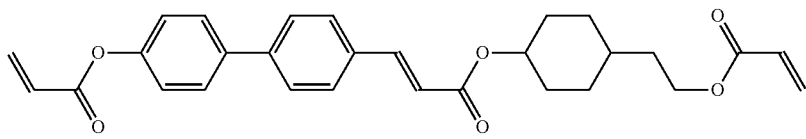
(Ia-9)
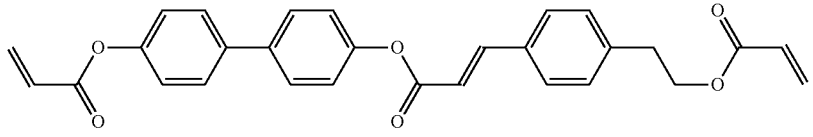
(Ia-10)
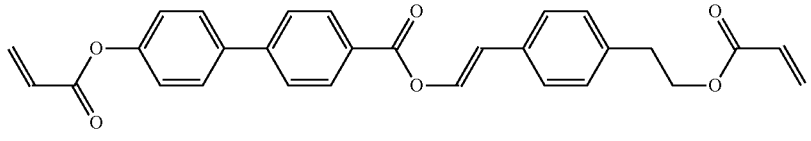
(Ia-11)
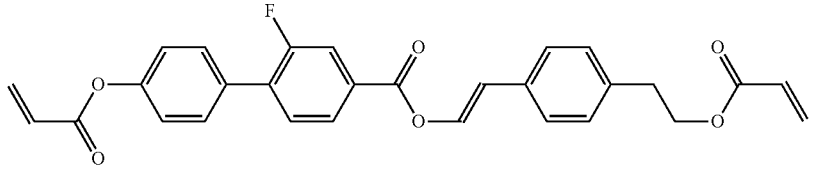
(Ia-12)
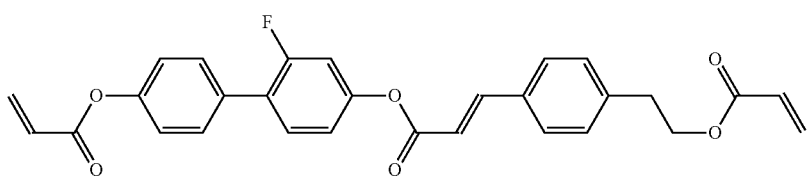

-continued
(Ia-13)
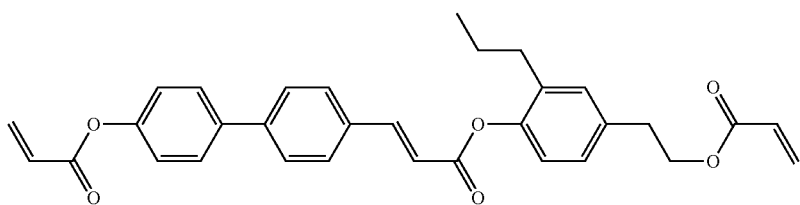
[Chem. 28]
(Ia-14)
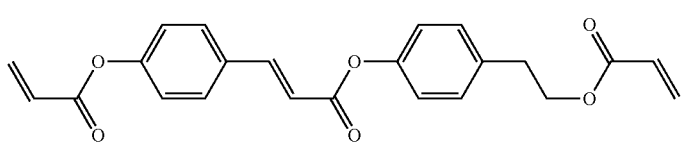
(Ia-15)
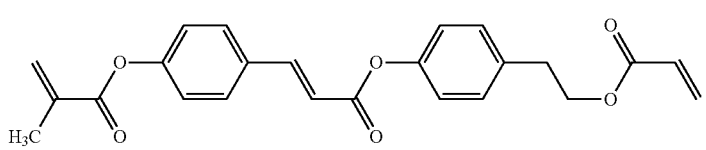
(Ia-16)
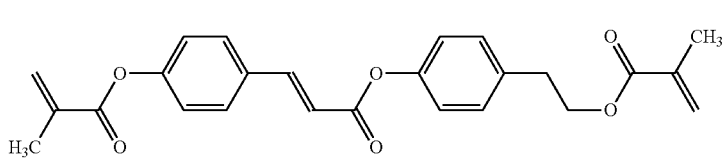
(Ia-17)
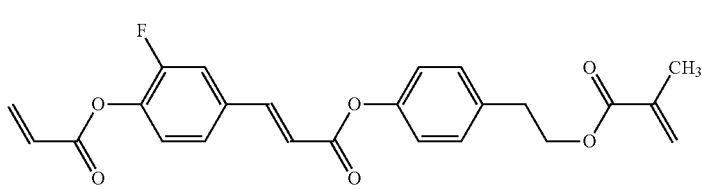
(Ia-18)
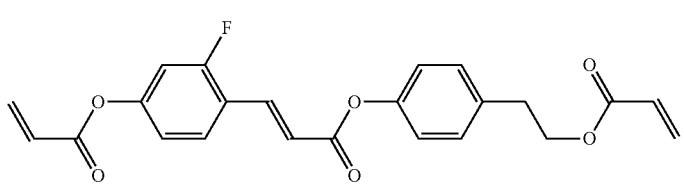
[Chem. 29]
(Ia-19)
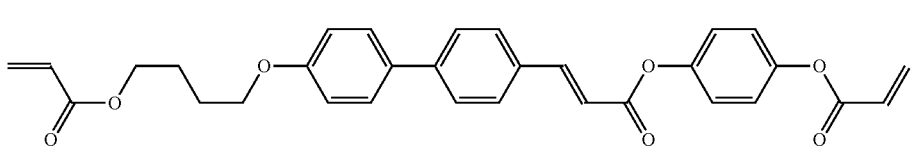
(Ia-20)
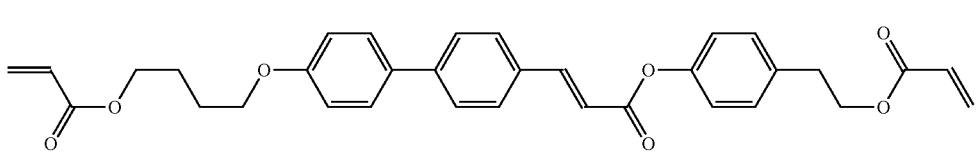
(Ia-21)
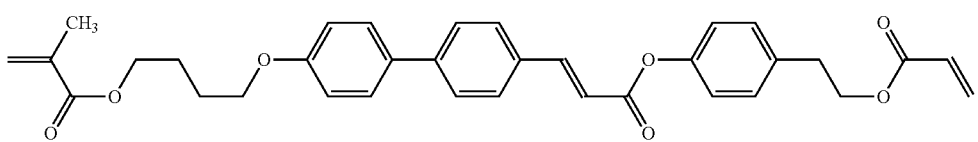

(Ia-22)
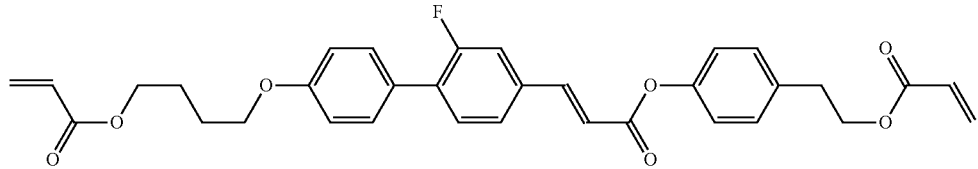
(Ia-23)
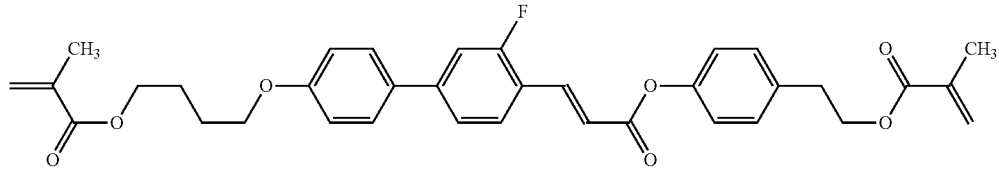
(Ia-24)
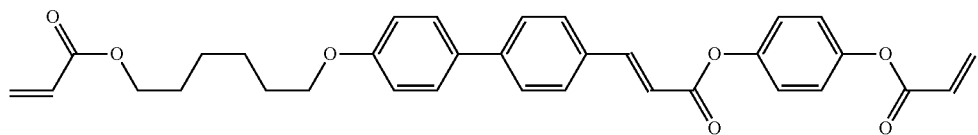
(Ia-25)
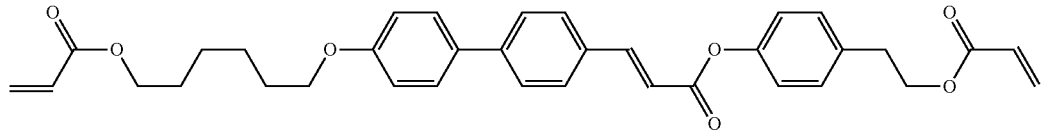
(Ia-26)
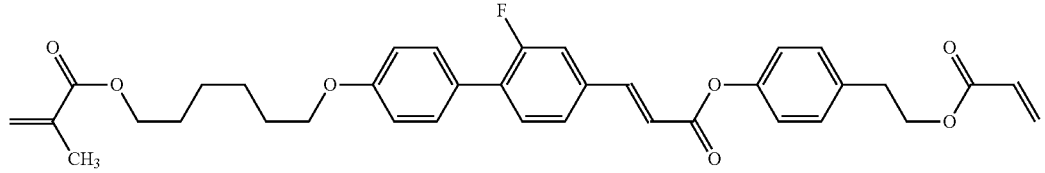
(Ia-27)
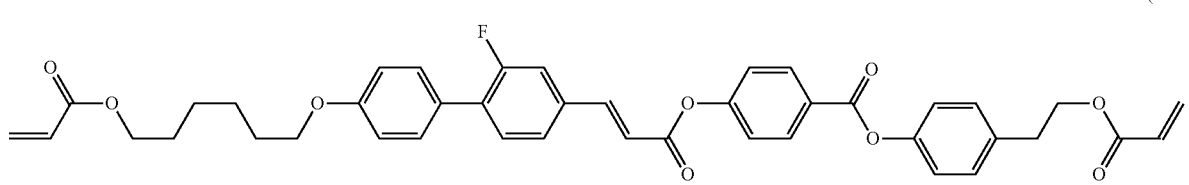
(Ia-28)
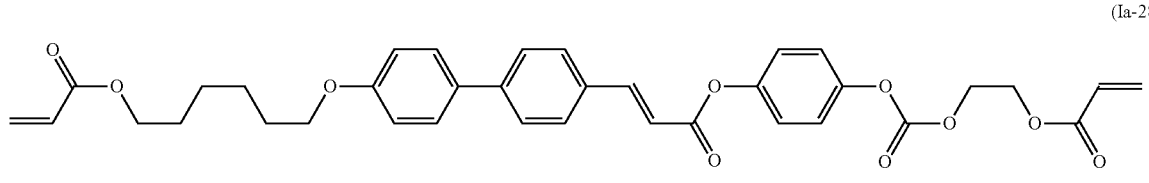
(Ia-29)
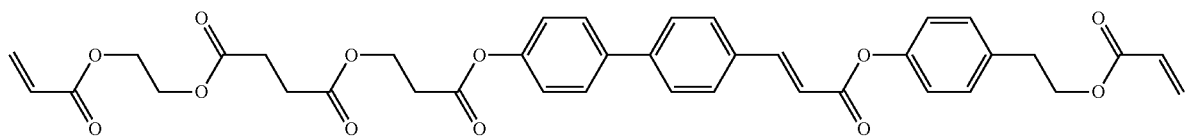
(Ia-30)
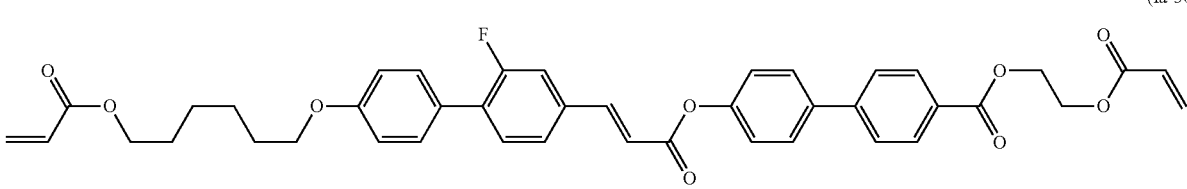

[Chem. 30]

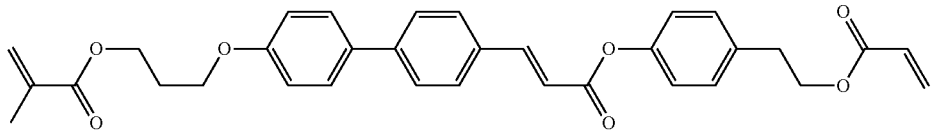

(Ia-31)

The polymerizable compound is preferably present in an amount of 0.01% to 2.00% by mass, more preferably 0.05% to 1.00% by mass, even more preferably 0.10% to 0.50% by mass. The use of an insufficient amount of polymerizable compound results in low anchoring strength for the liquid crystal composition. The use of an excessive amount of polymerizable compound requires a large amount of energy for polymerization and thus leaves a large amount of unpolymerized polymerizable compound, which leads to display defects.

Polymerizable compounds represented by general formula (RM-1) and containing the backbones listed above exhibit the optimum anchoring strength after polymerization for PSA mode liquid crystal display devices and thus contribute to good alignment. These polymerizable compounds are effective in reducing or eliminating display unevenness.

A polymerizable-compound containing liquid crystal composition according to the present invention that simultaneously contains first, second, and third components and a polymerizable compound represented by general formula (IV) has a low viscosity ($\eta$), a low rotational viscosity ($\gamma_1$), and a high elastic constant ($K_{33}$). A PSA mode or PSVA mode liquid crystal display device including the liquid crystal composition according to the present invention is capable of quick response.

A liquid crystal display device including the liquid crystal composition according to the present invention has the significant advantage of quick response. In particular, the liquid crystal display device is useful as an active-matrix liquid crystal display device and is applicable to the VA mode, the PSVA mode, the PSA mode, the IPS mode, and the ECB mode.

EXAMPLES

The present invention is further illustrated by the following examples, although these examples are not intended to limit the present invention. In the following examples and comparative examples, percentages of ingredients in compositions are by mass.

In the examples, compounds are denoted by the following abbreviations:
(Side Chains)
-n: —$C_nH_{2n+1}$ (linear $C_n$ alkyl)
n-: $C_nH_{2n+1}$— (linear $C_n$ alkyl)
-On: —$OC_nH_{2n+1}$ (linear $C_n$ alkoxyl)
nO-: $C_nH_{2n+1}O$— (linear $C_n$ alkoxyl)
-V: —CH=$CH_2$
V-: $CH_2$=CH—
-V1: —CH=CH—$CH_3$
1V-: $CH_3$—CH=CH—
-2V: —$CH_2$—$CH_2$—CH=$CH_3$
V2-: $CH_3$=CH—$CH_2$—$CH_2$—
-2V1: —$CH_2$—$CH_2$—CH=CH—$CH_3$
1V2-: $CH_3$—CH=CH—$CH_2$—$CH_2$
(Ring Structures)

[Chem. 31]

 Cy

 Ph

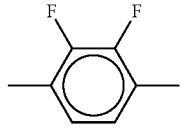 Ph5

In the examples, the following properties were examined:
$T_{ni}$: nematic phase-isotropic liquid phase transition temperature (° C.)
$\Delta n$: refractive index anisotropy at 20° C.
$\Delta\epsilon$: dielectric anisotropy at 25° C.
$\eta$: viscosity at 20° C. (mPa·s)
$\gamma_1$: rotational viscosity at 20° C. (mPa·s)
$K_{33}$: elastic constant $K_{33}$ at 20° C. (pN)

Comparative Example 1 and Examples 1 to 3

Liquid Crystal Compositions LC-A (Comparative Example 1), LC-1 (Example 1), LC-2 (Example 2), and LC-3 (Example 3) were prepared and examined for their physical properties. The compositions and physical properties of the liquid crystal compositions are summarized in Table 1.

TABLE 1

| | | Comparative Example 1 LC-A | Example 1 LC-1 | Example 2 LC-2 | Example 3 LC-3 |
|---|---|---|---|---|---|
| 3-Ph—Ph-1 | general formula (III-F) | 8 | 6 | 6 | 4 |
| 3-Cy-Cy-2 | general formula (III-A) | 18 | 4 | 4 | 18 |
| 3-Cy-Cy-4 | general formula (III-A) | 9 | 4 | 4 | — |
| 3-Cy-Cy-5 | general formula (III-A) | 6 | — | — | — |

TABLE 1-continued

|  |  | Comparative Example 1 LC-A | Example 1 LC-1 | Example 2 LC-2 | Example 3 LC-3 |
|---|---|---|---|---|---|
| 3-Cy-Cy-V | general formula (III-A) | — | 13 | 13 | — |
| 2-Cy-Cy-V1 | formula (I) | — | 13 | 13 | 16 |
| 3-Cy-Cy-Ph-1 | general formula (III-G) | 4 | 4 | 4 | 6 |
| 3-Cy-1O—Ph5—O1 | general formula (II-A1) | 3 | 2 | — | — |
| 3-Cy-1O—Ph5—O2 | general formula (II-A1) | 8 | 8 | 10 | 6 |
| 1V-Cy-1O—Ph5—O2 | general formula (II-A1) | — | — | — | 4 |
| 2-Cy-Cy-1O—Ph5—O2 | general formula (II-A3) | 13 | 14 | 11 | 10 |
| 3-Cy-Cy-1O—Ph5—O2 | general formula (II-A3) | 13 | 14 | 11 | 10 |
| V-Cy-Cy-1O—Ph5—O2 | general formula (II-A3) | — | — | — | 4 |
| 1V-Cy-Cy-1O—Ph5—O2 | general formula (II-A3) | — | — | — | 4 |
| 2-Cy-Ph—Ph5—O2 | general formula (II-B4) | — | — | 6 | — |
| 3-Cy-Ph—Ph5—O2 | general formula (II-B4) | — | — | 6 | — |
| 3-Ph—Ph5—Ph-1 | general formula (V) | 5 | 5 | 5 | — |
| 3-Ph—Ph5—Ph-2 | general formula (V) | 13 | 13 | 7 | 5 |
| V2-Ph—Ph5—Ph-2V | general formula (V) | — | — | — | 9 |
| 1V2-Ph—Ph5—Ph-2V1 | general formula (V) | — | — | — | 4 |
| Total |  | 100 | 100 | 100 | 100 |
| Tni [° C.] |  | 75.1 | 75.1 | 77.3 | 76 |
| Δn |  | 0.108 | 0.111 | 0.109 | 0.109 |
| η [mPa · s] |  | 18.1 | 15.6 | 15.9 | 16.3 |
| γ1 [mPa · s] |  | 120 | 108 | 111 | 115 |
| Δε |  | −3.1 | −3.1 | −3.2 | −3.1 |
| K33 [pN] |  | 13.6 | 14.4 | 14.8 | 15.5 |
| γ1/K33 |  | 8.8 | 7.5 | 7.5 | 7.4 |

Liquid Crystal Compositions LC-1, LC-2, and LC-3 according to the present invention had low viscosities (η), low rotational viscosities ($\gamma_1$), and high elastic constants ($K_{33}$) and had values of $\gamma_1/K_{33}$ of 7.5, 7.5, and 7.4, respectively, which are significantly lower than those of Liquid Crystal Composition LC-A of the comparative example. Response speed measurements showed that liquid crystal display devices using Liquid Crystal Compositions LC-1, LC-2, and LC-3 had sufficiently high response speeds, i.e., about 20% higher response speeds than a liquid crystal display device including Liquid Crystal Composition LC-A. Voltage holding ratio (VHR) measurements showed that these liquid crystal display devices had high VHRs. The cell thickness was 3.5 μm. The alignment films were JALS 2096. The response speed was measured at a $V_{on}$ of 5.5 V, a $V_{off}$ of 1.0 V, and a temperature of 20° C. using a DMS 301 instrument from Autronic-Melchers. The VHR was measured at a voltage of 5 V, a frequency of 60 Hz, and a temperature of 60° C. using a VHR-1 instrument from Toyo Corporation.

The polymerizable compound of formula (XX-4) was added to Liquid Crystal Compositions LC-1, LC-2, and LC-3 according to the present invention in an amount of 0.3%, with the total amount being 100%. The resulting compositions were injected into liquid crystal cells and were irradiated with UV light to fabricate PSA cells. The resulting liquid crystal display devices had high response speeds and high VHRs. Similar results were obtained when the polymerizable compound was added in an amount of 0.4%. The polymerizable compound of formula (M302) was added to Liquid Crystal Compositions LC-1, LC-2, and LC-3 according to the present invention in an amount of 0.3%, with the total amount being 100%. The resulting compositions were injected into liquid crystal cells and were irradiated with UV light to fabricate PSA cells. The resulting liquid crystal display devices had high response speeds and high VHRs. Similar results were obtained when the polymerizable compound was added in an amount of 0.4%.

The polymerizable compounds of formulae (XX-4) and (Ia-31) were added to Liquid Crystal Compositions LC-1, LC-2, and LC-3 according to the present invention in amounts of 0.3% and 0.1%, respectively, with the total amount being 100%. The resulting compositions were injected into liquid crystal cells and were irradiated with UV light to fabricate PSA cells. The resulting liquid crystal display devices had high response speeds and high VHRs. The polymerizable compounds of formulae (XX-4) and (Ia-31) were added to Liquid Crystal Compositions LC-1, LC-2, and LC-3 according to the present invention in amounts of 0.35% and 0.05%, respectively, with the total amount being 100%. The resulting compositions were injected into liquid crystal cells and were irradiated with UV light to fabricate PSA cells. The resulting liquid crystal display devices had high response speeds and high VHRs. The polymerizable compounds of formulae (M302) and (Ia-31) were added to Liquid Crystal Compositions LC-1, LC-2, and LC-3 according to the present invention in amounts of 0.35% and 0.05%, respectively, with the total amount being 100%. The resulting compositions were injected into liquid crystal cells and were irradiated with UV light to fabricate PSA cells. The resulting liquid crystal display devices had high response speeds and high VHRs. The polymerizable compounds of formulae (M302) and (XX-2) were added to Liquid Crystal Compositions LC-1, LC-2, and LC-3 according to the present invention in amounts of 0.35% and 0.05%, respectively, with the total amount being 100%. The resulting compositions were injected into liquid crystal cells and were irradiated with UV light to fabricate PSA cells. The resulting liquid crystal display devices had high response speeds and high VHRs. The polymerizable compounds of formulae (M302) and (XX-2) were added to Liquid Crystal Compositions LC-1, LC-2, and LC-3 according to the present invention, each in an amount of 0.2%, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (XX-4) and (XX-2) were added to Liquid Crystal Compositions LC-1, LC-2, and LC-3 according to the present invention, each in an amount of 0.2%, with the total amount being 100%. The resulting compositions were injected into liquid crystal cells and were irradiated with UV light to fabricate PSA cells. The resulting liquid crystal display devices had high response speeds and high VHRs.

Comparative Examples 2 and 3 and Examples 4 and 5

Liquid Crystal Compositions LC-B (Comparative Example 2), LC-C (Comparative Example 3), LC-4 (Example 4), and LC-5 (Example 5) were prepared and examined for their physical properties. The compositions and physical properties of the liquid crystal compositions are summarized in Table 2.

TABLE 2

| | | Comparative Example 2 LC-B | Comparative Example 3 LC-C | Example 4 LC-4 | Example 5 LC-5 |
|---|---|---|---|---|---|
| 5-Ph—Ph-1 | general formula (III-F) | 10 | 10 | 4 | — |
| 1V2-Ph—Ph-1 | general formula (III-F) | — | — | 3 | — |
| 3-Cy-Cy-V | general formula (III-A) | 29 | 19 | 20 | 13 |
| 5-Cy-Cy-V | general formula (III-A) | | 10 | | |
| 2-Cy-Cy-V1 | formula (I) | — | — | 10 | 25 |
| 2-Cy-Cy-Ph5—O1 | general formula (II-B3) | 11 | 11 | 10 | 9 |
| 2-Cy-Cy-Ph5—O2 | general formula (II-B3) | 11 | 11 | 11 | 10 |
| 3-Cy-Cy-Ph5—O2 | general formula (II-B3) | 11 | 11 | 11 | 10 |
| 3-Cy-Ph—Ph5—O2 | general formula (II-B4) | 6 | 6 | 7 | 7 |
| 3-Cy-Ph5—O2 | general formula (II-B1) | 4 | 4 | | — |
| 3-Ph—Ph5—O2 | general formula (II-B2) | — | — | 6 | 8 |
| 3-Ph—Ph5—Ph-1 | general formula (V) | 6 | 6 | 4 | |
| 3-Ph—Ph5—Ph-2 | general formula (V) | 12 | 12 | 4 | 6 |
| V2-Ph—Ph5—Ph-2V | general formula (V) | — | — | 10 | 12 |
| Total | | 100 | 100 | 100 | 100 |
| Tni [° C.] | | 79.5 | 81.1 | 79.9 | 80.1 |
| Δn | | 0.119 | 0.120 | 0.120 | 0.119 |
| η [mPa · s] | | 18.6 | 20.3 | 17.5 | 17.4 |
| γ1 [mPa · s] | | 105 | 112 | 99 | 95 |
| Δε | | −2.5 | −2.5 | −2.5 | −2.5 |
| K33 [pN] | | 13.6 | 13.7 | 14.5 | 14.7 |
| γ1/K33 | | 7.7 | 8.2 | 6.8 | 6.5 |

Liquid Crystal Compositions LC-4 and LC-5 according to the present invention had low viscosities ($\eta$), low rotational viscosities ($\gamma_1$), and high elastic constants ($K_{33}$) and had values of $\gamma_1/K_{33}$ of 6.8 and 6.5, respectively, which are significantly lower than those of Liquid Crystal Compositions LC-B and LC-C of the comparative examples. Response speed measurements showed that liquid crystal display devices including Liquid Crystal Compositions LC-4 and LC-5 had sufficiently high response speeds, i.e., about 10% higher response speeds than a liquid crystal display device including Liquid Crystal Composition LC-B. Voltage holding ratio (VHR) measurements showed that these liquid crystal display devices had high VHRs. The cell thickness was 3.5 μm. The alignment films were JALS 2096. The response speed was measured at a $V_{on}$ of 5.5 V, a $V_{off}$ of 1.0 V, and a temperature of 20° C. using a DMS 301 instrument from Autronic-Melchers. The VHR was measured at a voltage of 5 V, a frequency of 60 Hz, and a temperature of 60° C. using a VHR-1 instrument from Toyo Corporation.

The polymerizable compound of formula (XX-4) was added to Liquid Crystal Compositions LC-4 and LC-5 according to the present invention in an amount of 0.3%, with the total amount being 100%. The resulting compositions were injected into liquid crystal cells and were irradiated with UV light to fabricate PSA cells. The resulting liquid crystal display devices had high response speeds and high VHRs. Similar results were obtained when the polymerizable compound was added in an amount of 0.4%.

The polymerizable compound of formula (M302) was added to Liquid Crystal Compositions LC-4 and LC-5 according to the present invention in an amount of 0.3%, with the total amount being 100%. The resulting compositions were injected into liquid crystal cells and were irradiated with UV light to fabricate PSA cells. The resulting liquid crystal display devices had high response speeds and high VHRs. Similar results were obtained when the polymerizable compound was added in an amount of 0.4%.

The polymerizable compounds of formulae (XX-4) and (Ia-31) were added to Liquid Crystal Compositions LC-4 and LC-5 according to the present invention in amounts of 0.3% and 0.1%, respectively, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (XX-4) and (Ia-31) were added to Liquid Crystal Compositions LC-4 and LC-5 according to the present invention in amounts of 0.35% and 0.05%, respectively, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (M302) and (Ia-31) were added to Liquid Crystal Compositions LC-4 and LC-5 according to the present invention in amounts of 0.35% and 0.05%, respectively, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (M302) and (XX-2) were added to Liquid Crystal Compositions LC-4 and LC-5 according to the present invention in amounts of 0.35% and 0.05%, respectively, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (M302) and (XX-2) were added to Liquid Crystal Compositions LC-4 and LC-5 according to the present invention, each in an amount of 0.2%, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (XX-4) and (XX-2) were added to Liquid Crystal Compositions LC-4 and LC-5 according to the present invention, each in an amount of 0.2%, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (XX-1) and (XX-2) were added to Liquid Crystal Compositions LC-4 and LC-5 according to the present invention, each in an amount of 0.2%, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (XX-3) and (XX-4) were added to Liquid Crystal Compositions LC-4 and LC-5 according to the present invention, each in an amount of 0.2%, with the total amount being 100%. The resulting compositions were injected into liquid crystal cells and were irradiated with UV light to fabricate PSA cells. The resulting liquid crystal display devices had high response speeds and high VHRs.

The polymerizable compounds of formulae (M31), (M32), and (M33) were added to Liquid Crystal Compositions LC-4 and LC-5 according to the present invention, each in an amount of 0.1%, with the total amount being 100%. The resulting compositions were injected into liquid crystal cells and were irradiated with UV light to fabricate PSA cells. The resulting liquid crystal display devices had high response speeds and high VHRs.

The above results demonstrate that a liquid crystal composition according to the present invention has a negative dielectric anisotropy (Δε) large in absolute value, a sufficiently low viscosity (η), a sufficiently low rotational viscosity ($\gamma_1$), and a high elastic constant ($K_{33}$) without decreased refractive index anisotropy (Δn) or nematic phase-isotropic liquid phase transition temperature ($T_{ni}$) and that a VA mode liquid crystal display device including the liquid crystal composition according to the present invention has high response speed and good display quality. The results also demonstrate that a PSA mode liquid crystal display device having high response speed and good display quality can be provided.

The invention claimed is:

1. A liquid crystal composition comprising a first component and a second component, the first component comprising a compound represented by formula (I):

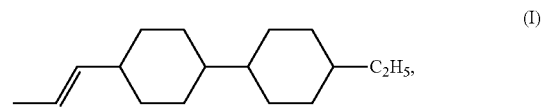

the first component being present in an amount of 10 to 30% by mass, and the second component comprising one or more compounds selected from compounds represented by general formula (II):

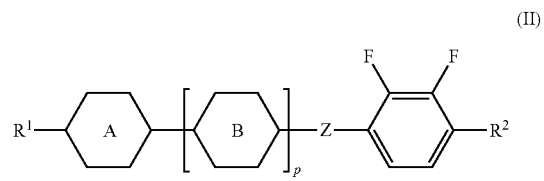

wherein in the general formula (II), $R^1$ and $R^2$ are each independently an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, wherein one or more nonadjacent —CH$_2$— groups present in $R^1$ and $R^2$ are each independently optionally replaced by —O— and/or —S—, and one or more hydrogen atoms present in $R^1$ and $R^2$ are each independently optionally replaced by a fluorine atom or a chlorine atom; rings A and B are each independently trans-1,4-cyclohexylene, 1,4-phenylene, 2-fluoro-1,4-phenylene, 3-fluoro-1,4-phenylene, 3,5-difluoro-1,4-phenylene, 2,3-difluoro-1,4-phenylene; p is 0, 1, or 2; and Z is —CH$_2$O— or —CH$_2$CH$_2$—).

2. The liquid crystal composition according to claim 1, wherein the liquid crystal composition has a dielectric anisotropy (Δε) at 25° C. of −2.0 to −8.0, a refractive index anisotropy (Δn) at 20° C. of 0.08 to 0.14, a viscosity (η) at 20° C. of 10 to 30 mPa·s, a rotational viscosity ($\gamma_1$) at 20° C. of 60 to 130 mPa·s, and a nematic phase-isotropic liquid phase transition temperature ($T_{ni}$) of 60° C. to 120° C.

3. The liquid crystal composition according to claim 1, wherein the second component is present in an amount of 10% to 90% by mass.

4. The liquid crystal composition according to claim 1, wherein the compounds of general formula (II) for the second component are compounds of general formulae (II-A1) to (II-A5) and (II-B1) to (II-B5):

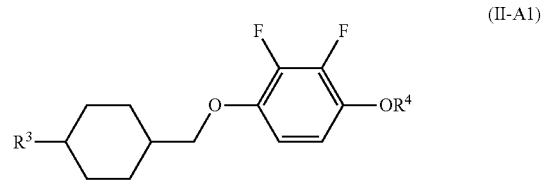

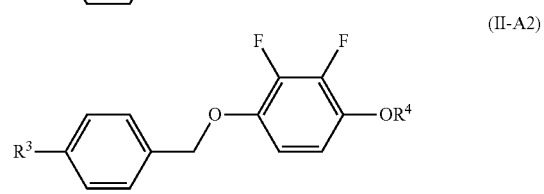

-continued

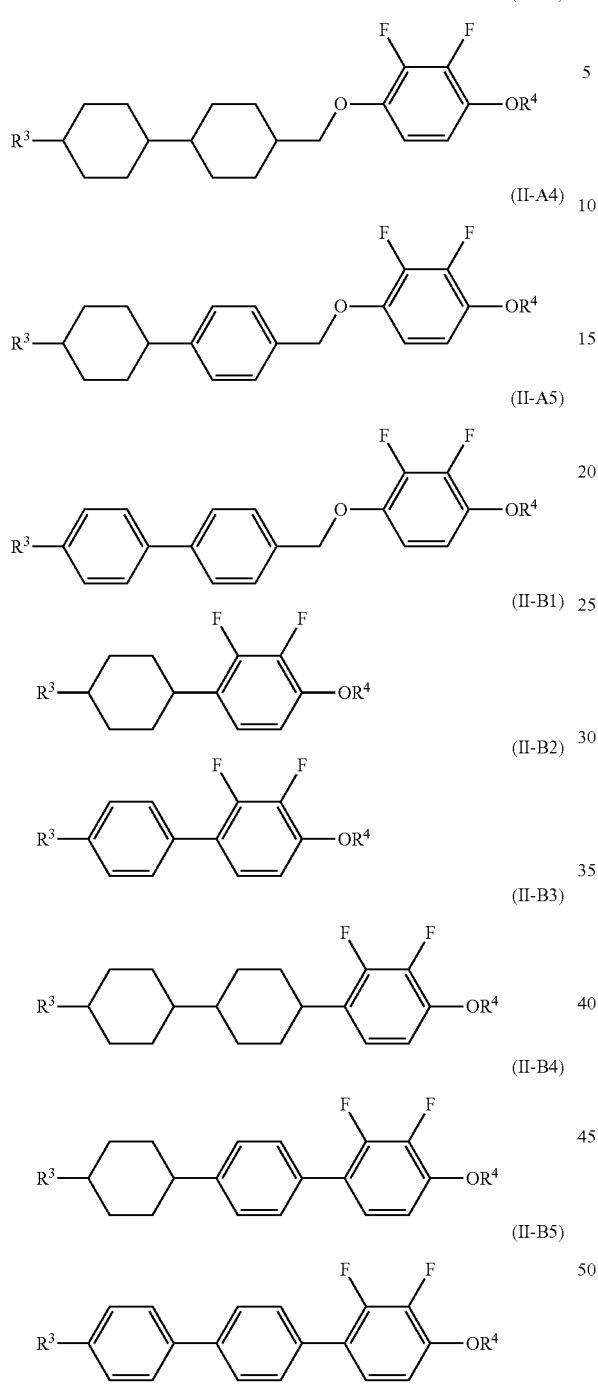

(wherein $R^3$ and $R^4$ are each independently an alkyl group having 1 to 5 carbon atoms or an alkenyl group having 2 to 5 carbon atoms, wherein one or more hydrogen atoms present in $R^3$ and $R^4$ are each independently optionally replaced by a fluorine atom).

5. The liquid crystal composition according to claim 4, wherein the second component comprises one or more compounds selected from the group consisting of compounds represented by general formulae (II-A1) to (II-A5).

6. The liquid crystal composition according to claim 1, further comprising a third component, the third component comprising one or more compounds selected from the group consisting of compounds represented by general formulae (III-A) to (III-J):

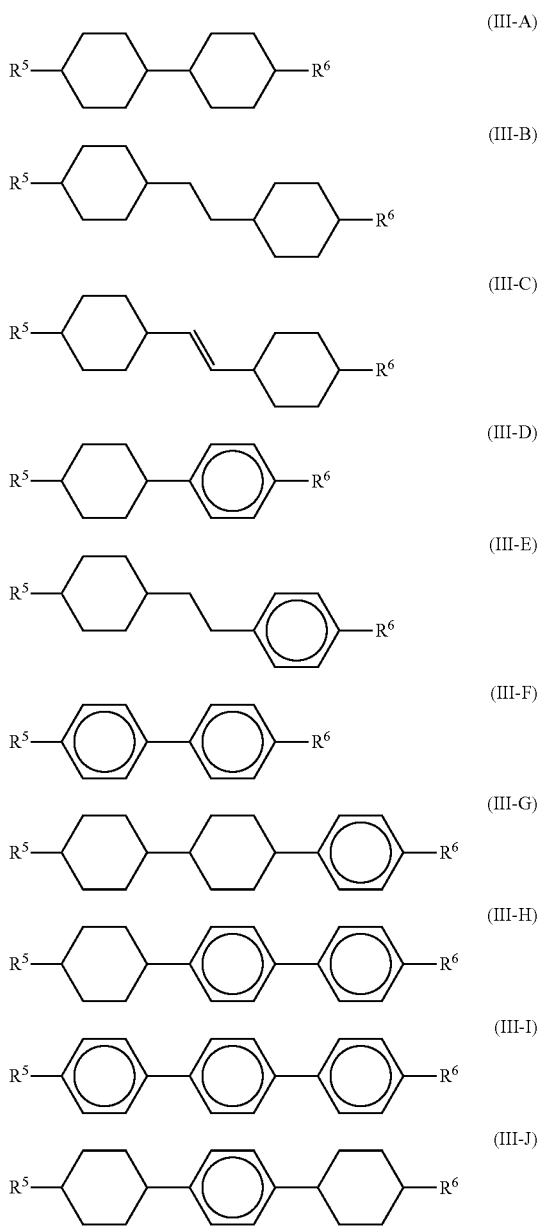

(wherein $R^5$ is an alkyl group having 1 to 5 carbon atoms or an alkenyl group having 2 to 5 carbon atoms; and $R^6$ is an alkyl group having 1 to 5 carbon atoms, an alkoxyl group having 1 to 5 carbon atoms, an alkenyl group having 2 to 5 carbon atoms, or an alkenyloxy group having 2 to 5 carbon atoms, wherein the compounds represented by general formula (III-A) do not include the compound represented by formula (I)).

7. The liquid crystal composition according to claim 6, wherein the liquid crystal composition comprises the compound represented by formula (I), a compound represented by general formula (II-A1), and a compound represented by general formula (III-A),

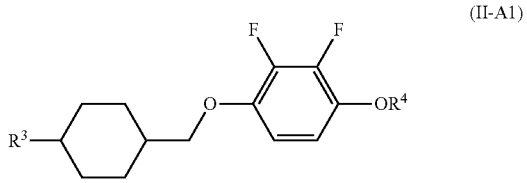

(II-A1)

(wherein $R^3$ and $R^4$ are each independently an alkyl group having 1 to 5 carbon atoms or an alkenyl group having 2 to 5 carbon atoms, wherein one or more hydrogen atoms present in $R^3$ and $R^4$ are each independently optionally replaced by a fluorine atom).

8. The liquid crystal composition according to claim 6, wherein the liquid crystal composition comprises the compound represented by formula (I), a compound represented by general formula (II-A3), and a compound represented by general formula (III-A),

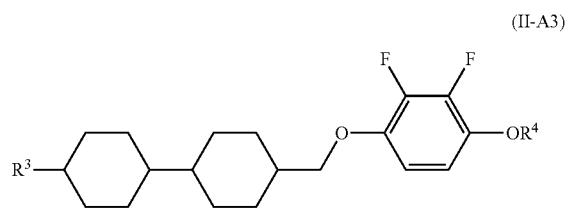

(II-A3)

(wherein $R^3$ and $R^4$ are each independently an alkyl group having 1 to 5 carbon atoms or an alkenyl group having 2 to 5 carbon atoms, wherein one or more hydrogen atoms present in $R^3$ and $R^4$ are each independently optionally replaced by a fluorine atom).

9. The liquid crystal composition according to claim 6, wherein the liquid crystal composition comprises the compound represented by formula (I), a compound represented by general formula (II-B1), and a compound represented by general formula (III-A),

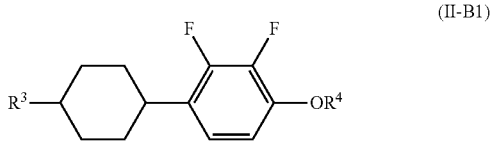

(II-B1)

(wherein $R^3$ and $R^4$ are each independently an alkyl group having 1 to 5 carbon atoms or an alkenyl group having 2 to 5 carbon atoms, wherein one or more hydrogen atoms present in $R^3$ and $R^4$ are each independently optionally replaced by a fluorine atom).

10. The liquid crystal composition according to claim 6, wherein the liquid crystal composition comprises the compound represented by formula (I), a compound represented by general formula (II-B2), and a compound represented by general formula (III-A),

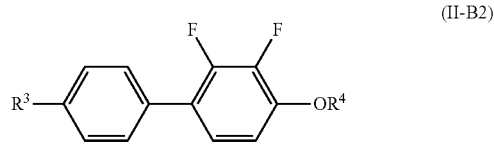

(II-B2)

(wherein $R^3$ and $R^4$ are each independently an alkyl group having 1 to 5 carbon atoms or an alkenyl group having 2 to 5 carbon atoms, wherein one or more hydrogen atoms present in $R^3$ and $R^4$ are each independently optionally replaced by a fluorine atom).

11. The liquid crystal composition according to claim 6, wherein the liquid crystal composition comprises the compound represented by formula (I), a compound represented by general formula (II-B3), and a compound represented by general formula (III-A),

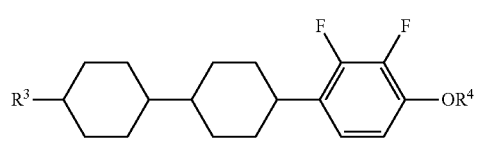

(II-B3)

(wherein $R^3$ and $R^4$ are each independently an alkyl group having 1 to 5 carbon atoms or an alkenyl group having 2 to 5 carbon atoms, wherein one or more hydrogen atoms present in $R^3$ and $R^4$ are each independently optionally replaced by a fluorine atom).

12. The liquid crystal composition according to claim 6, wherein the liquid crystal composition comprises the compound represented by formula (I), a compound represented by general formula (II-B4), and a compound represented by general formula (III-A),

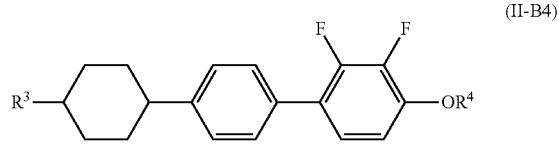

(II-B4)

(wherein $R^3$ and $R^4$ are each independently an alkyl group having 1 to 5 carbon atoms or an alkenyl group having 2 to 5 carbon atoms, wherein one or more hydrogen atoms present in $R^3$ and $R^4$ are each independently optionally replaced by a fluorine atom).

13. The liquid crystal composition according to claim 1, further comprising another component, the other component comprising one or more compounds represented by general formula (V):

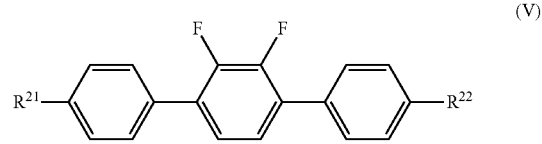

(V)

(wherein $R^{21}$ and $R^{22}$ are each independently an alkyl group having 1 to 8 carbon atoms, an alkoxyl group having 1 to 8 carbon atoms, an alkenyl group having 2 to 8 carbon atoms, or an alkenyloxyl group having 2 to 8 carbon atoms).

14. The liquid crystal composition according to claim 1, further comprising a polymerizable compound.

15. The liquid crystal composition according to claim 14, wherein the polymerizable compound is represented by general formula (RM-1):

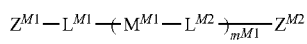
(RM-1)

(wherein
$Z^{M1}$ and $Z^{M2}$ are each independently:

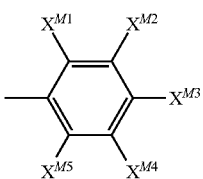

wherein $X^{M1}$ to $X^{M5}$ are each a hydrogen atom, a fluorine atom, or:

wherein at least one of $X^{M1}$ to $X^{M5}$ is:

wherein
$S^{M1}$ is an alkylene group having 1 to 12 carbon atoms or a single bond, wherein the —CH$_2$— group(s) in the alkylene group is optionally replaced by an oxygen atom, —COO—, —OCO—, or —OCOO—, with the proviso that no oxygen atoms are directly linked to each other, and
$R^7$ is any of formulae (R-1) to (R-15):

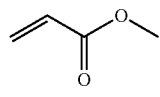
(R-1)

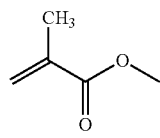
(R-2)

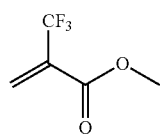
(R-3)

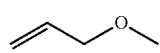
(R-4)

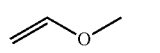
(R-5)

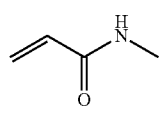
(R-6)

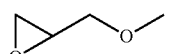
(R-7)

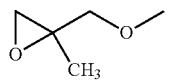
(R-8)

(R-9)

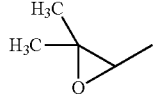
(R-10)

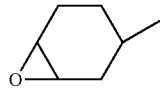
(R-11)

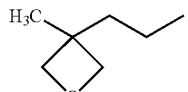
(R-12)

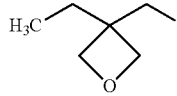
(R-13)

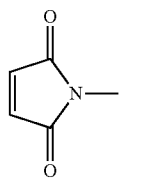
(R-14)

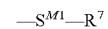
(R-15)

$L^{M1}$ and $L^{M2}$ are each independently a single bond, —O—, —CH$_2$—, —OCH$_2$—, —CH$_2$O—, —CO—, —C$_2$H$_4$—, —COO—, —OCO—, —CH=CH—COO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF=CF—, —CF$_2$—, —CF$_2$O—, —OCF$_2$—, —CF$_2$CH$_2$—, —CH$_2$CF$_2$—, —CF$_2$CF$_2$—, or —C≡C—, wherein if there is more than one $L^{M2}$, each may be the same or different;

$M^{M1}$, if present, is 1,4-phenylene, 1,4-cyclohexylene, or naphthalene-2,6-diyl, wherein the hydrogen atoms present in these groups are optionally replaced by a fluorine atom, a chlorine atom, an alkyl, halogenated alkyl, halogenated alkoxy, or alkoxy group having 1 to 8 carbon atoms, a nitro group, or:

—$S^{M1}$—$R^7$ $m^{M1}$ is 0, 1, or 2; and
if there is more than one $X^{M1}$, $X^{M2}$, $X^{M3}$, $X^{M4}$, $X^{M5}$, $S^{M1}$, $R^{M1}$, $L^{M2}$, and/or $M^{M1}$, each may be the same or different).

16. The liquid crystal composition according to claim 14, wherein the polymerizable compound is represented by general formula (IV):

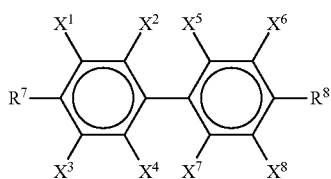

(IV)

(wherein X¹ to X⁸ are each independently trifluoromethyl, trifluoromethoxy, fluorine, or hydrogen; and R⁷ and R⁸ are each independently any of formulae (R-1) to (R-15):

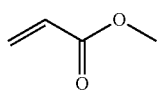 (R-1)

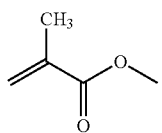 (R-2)

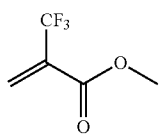 (R-3)

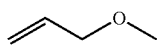 (R-4)

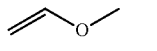 (R-5)

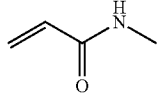 (R-6)

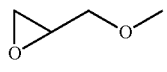 (R-7)

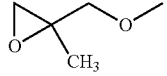 (R-8)

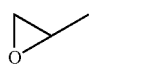 (R-9)

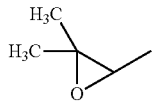 (R-10)

 (R-11)

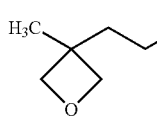 (R-12)

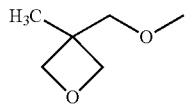 (R-13)

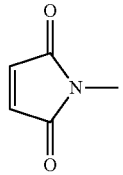 (R-14)

HS— (R-15)

17. A liquid crystal display device comprising the liquid crystal composition according to claim 1.

18. An active-matrix liquid crystal display device comprising the liquid crystal composition according to claim 1.

19. A VA mode, PSA mode, PSVA mode, IPS mode, or ECB mode liquid crystal display device comprising the liquid crystal composition according to claim 1.

20. A liquid crystal composition comprising a first component and a second component, the first component comprising a compound represented by formula (I):

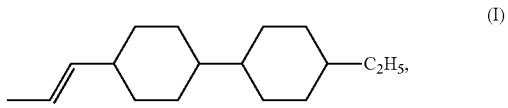

(I)

the first component being present in an amount of 3% to 50% by mass, and the second component comprising one or more compounds selected from compounds represented by general formula (II):

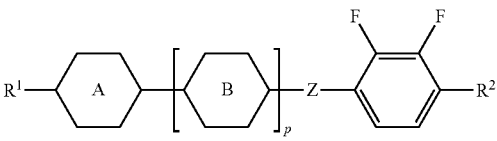

(II)

Wherein in the general formula (II), $R^1$ and $R^2$ are each independently an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, wherein one or more nonadjacent —CH₂— groups present in $R^1$ and $R^2$ are each independently optionally replaced by —O— and/or —S—, and one or more hydrogen atoms present in $R^1$ and $R^2$ are each independently optionally replaced by a fluorine atom or a chlorine atom; ring A is independently 1,4-phenylene, 2-fluoro-1,4-phenylene, 3-fluoro-1,4-phenylene, 3,5-difluoro-1,4-phenylene, 2,3-difluoro-1,4-phenylene; ring B is independently trans-1,4-cyclohexylene, 1,4-phenylene, 2-fluoro-1,4-phenylene, 3-fluoro-1,4-phenylene, 3,5-difluoro-1,4-phenylene, 2,3-difluoro-1,4-phenylene; p is 0, 1, or 2; and Z is —CH₂O—, —CH₂CH₂—, or a single bond.

\* \* \* \* \*